(12) United States Patent
De Wilde et al.

(10) Patent No.: US 10,652,966 B2
(45) Date of Patent: May 12, 2020

(54) MITIGATING DISTORTION IN CODED LIGHT

(71) Applicant: SIGNIFY HOLDING B.V., Eindhoven (NL)

(72) Inventors: Erik De Wilde, Eindhoven (NL); Jurgen Margriet Antonius Willaert, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/492,703

(22) PCT Filed: Mar. 2, 2018

(86) PCT No.: PCT/EP2018/055211
§ 371 (c)(1),
(2) Date: Sep. 10, 2019

(87) PCT Pub. No.: WO2018/162359
PCT Pub. Date: Sep. 13, 2018

(65) Prior Publication Data
US 2020/0053851 A1    Feb. 13, 2020

(30) Foreign Application Priority Data
Mar. 10, 2017   (EP) .................... 17160358

(51) Int. Cl.
*H05B 33/08*   (2020.01)
*H04B 10/116*  (2013.01)

(52) U.S. Cl.
CPC ....... *H05B 33/0851* (2013.01); *H04B 10/116* (2013.01); *H05B 33/0821* (2013.01)

(58) Field of Classification Search
None
See application file for complete search history.

(56) References Cited

U.S. PATENT DOCUMENTS 7,916,779 B1    3/2011  Zhu
2010/0327764 A1* 12/2010 Knapp .................... H04L 12/43
                                                          315/250
(Continued)

FOREIGN PATENT DOCUMENTS

EP    2547173 A2    1/2013

OTHER PUBLICATIONS

Dilukshan Karunatilaka, et al., "LED Based Indoor Visible Light Communications: State of the Art", IEEE Communications Surveys & Tutorials, vol. 17, No. 3, Mar. 30, 2017, pp. 1649-1678.

*Primary Examiner* — Jany Richardson
(74) *Attorney, Agent, or Firm* — Akarsh P. Belagodu

(57) ABSTRACT

Current through an illumination source is controlled by means of a feedback loop whereby the current is measured and fed back to a current controller, which compares this to a set-point and based thereon outputs a current control signal which controls downstream power circuitry driving the current through the illumination source. This keeps the illumination at a steady dim level. Data is also coded into the illumination by modulating the current control signal, i.e. at the output of the current controller, but prior to the input to the power circuitry. The present disclosure provides a compensation filter arranged to apply a compensation to the error signal, to at least partially remove an effect of a distortion of the current measurement caused by the modulation of the data symbols into the illumination source current.

15 Claims, 19 Drawing Sheets

(56) References Cited

U.S. PATENT DOCUMENTS

2017/0078026 A1* 3/2017 Brilman .............. H04B 10/116
2017/0188420 A1* 6/2017 Kido ................... H04B 10/116
2019/0268069 A1* 8/2019 Nishino ............. H05B 33/0845

* cited by examiner

MITIGATING DISTORTION IN CODED LIGHT

CROSS-REFERENCE TO PRIOR APPLICATIONS

This application is the U.S. National Phase application under 35 U.S.C. § 371 of International Application No. PCT/EP2018/055211, filed on Mar. 2, 2018, which claims the benefit of European Patent Application No. 17160358.2, filed on Mar. 10, 2017. These applications are hereby incorporated by reference herein.

TECHNICAL FIELD

The present disclosure relates to mitigating distortion occurring in the symbols of a coded light signal, wherein the distortion in a given symbol may be dependent on one or more preceding symbols (i.e. inter-symbol interference).

BACKGROUND

Coded light refers to techniques whereby data is modulated into the light emitted by a light source, such as an LED-based light source. In this way the data may be said to be embedded into the light from the light source. For instance, data may be modulated into the visible illumination emitted by a luminaire such as an LED-based luminaire. Thus in addition to providing illumination to illuminate the environment (for which purpose a light source may already be present in the environment), the light source also acts as a transmitter capable of transmitting data to a suitable receiver of coded light. The modulation is typically performed at a high enough frequency that, despite the illumination being in the visible spectrum, the modulation is imperceptible to human vision. I.e. so the user only perceives the overall illumination and not the effect of the data being modulated into that illumination.

Data is modulated into the light by means of a technique such as amplitude keying, frequency shift keying or pulse width modulation, whereby the modulated property (e.g. amplitude, frequency or duty cycle) is used to represent channel symbols. The modulation typically involves a coding scheme to map data bits (sometimes referred to as user bits) onto such channel symbols. An example is a conventional Manchester code, which is a binary code whereby a user bit of value 0 is mapped onto a channel symbol in the form of a low-high pulse and a user bit of value 1 is mapped onto a channel symbol in the form of a high-low pulse. Another example is the recently developed ternary Manchester code.

European patent application EP 2 547 173 A2 discloses an example of an illumination light communication device that includes; a power supply unit controlling a load current flowing through the light source unit to be maintained at a constant; a switch element connected in series to the light source unit; and a control unit configured to control on/off of the switch element to modulate a light intensity of illumination light from the light source unit such that a binary communication signal is superimposed on the illumination light.

There are a number of known techniques for detecting and decoding coded light at the receive side. For example, coded light can be detected using an everyday 'rolling shutter' type camera, as is often integrated into a mobile device like a mobile phone or tablet. In a rolling-shutter camera, the camera's image capture element is divided into a plurality of lines (typically horizontal lines, i.e. rows) which are exposed in sequence line-by-line. That is, to capture a given frame, first one line is exposed to the light in the target environment, then the next line in the sequence is exposed at a slightly later time, and so forth. Typically the sequence 'rolls' in order across the frame, e.g. in rows top to bottom, hence the name 'rolling shutter'. When used to capture coded light, this means different lines within a frame capture the light at different times and therefore, if the line rate is high enough relative to the modulation frequency, at different phases of the modulation waveform. Thus the modulation in the light can be detected. Coded light can also be detected by using a global shutter camera if the frame rate is high enough relative to the modulation frequency, or using a dedicated photocell with suitable sample rate.

A luminaire that supports transmission of coded light signals can enable many applications of interest.

For example, the data embedded in the illumination emitted by a light source may comprise an identifier of that light source. This identifier can then be detected by a remote control unit, and used to identify the light source in order to control it remotely via a back channel such as an RF back channel. E.g. the remote control unit may take the form of a smartphone or tablet running a remote control application (or "app"), in which case the light sensor may be the built-in camera of the device. The app detects the identifier using the camera, and then uses this to address the light source via an RF access technology such as Wi-Fi, ZigBee or Bluetooth.

In another example, the identifier can be used for navigation, or to provide other location-based information or functionality. This is achieved by providing a mapping between the identifier of the light source and a known location of the light source, and/or other information associated with the location. In this case a device such as a mobile phone or tablet which receives the light (e.g. through a built-in camera) can detect the embedded identifier and use it to look up the corresponding location and/or other information mapped to the identifier (e.g. in a location database accessed over a network such as the Internet). The purpose of looking up the location of the device could be to help the user of the device navigate, e.g. to find his or her way throughout a large building or complex such as a hospital; and/or to determine whether the device is entitled to access some location-based service such as the ability to control the lighting in a particular room. Or in the case of mapping other information to the identifier, this could be used to look up information relevant to the location in which the light source is deployed, such as to look up information about a museum exhibit in a certain room or zone of the museum.

In yet further applications, information other than just an identifier can be directly encoded into the light (as opposed to being looked up based on an ID embedded in the light). Thus coded light can be used as an alternative (or supplement) to radio-based means of broadcasting any arbitrary data content that might be desired for the application in question.

SUMMARY

To keep the overall illumination contribution at a constant level requires a feedback loop, in which the current flowing through the illumination source is measured and fed back to be compared with an input set-point signal specifying the desired dim level. However, the inventors have recognized that, even if a filter is included in the feedback loop to filter the measurement of the current, the modulation representing the data in the output current can appear in the feedback of the measured current and hence disturb the feedback loop which is trying to keep the base illumination at a constant dim level. This in turn can distort the symbols of data themselves which are modulated relative to the base illumination level. I.e. the symbols are injected/superimposed on the output of the feedback loop, so if the feedback loop is disturbed, the output of the feedback loop is disturbed which will disturb the symbols.

To address this, according to one aspect disclosed herein there is provided apparatus for controlling a current flowing through an illumination source, the driver circuitry comprising: current measurement circuitry arranged to take a current measurement measuring the current flowing through the illumination source; a current controller configured to output a current control signal to control the current flowing through the illumination source, and thereby control an amount of illumination emitted by the illumination source; power circuitry arranged to receive the current control signal and in dependence thereon to drive the current through the illumination source, the current controller being configured to adjust the current control signal based on an error signal representing a comparison between an input set-point and the current measurement fed back from the current measurement circuitry, in order to thereby keep said current substantially steady at a level specified by said set-point; a coded light injector arranged to modulate the current control signal output by the current controller in order to cause a sequence of data symbols to be modulated into the current flowing through the illumination source, and to thereby cause the sequence of data symbols to be embedded in the emitted illumination; and a compensation filter arranged to apply a compensation to the error signal, to at least partially remove an effect of a distortion of the current measurement caused by the modulation of the data symbols into said current.

Preferably the compensation is based on a second feedback loop to measure the actual distortion in each respective symbol.

Hence in embodiments the compensation filter takes the form of an adaptive filter arranged to receive feedback of the current measurement for each respective one of said symbols, and based thereon to perform an adaptation of said compensation on a per symbol basis, by adaptively determining a respective distortion between the current measurement and a nominal current expected to represent the respective symbol, and based thereon applying a respective compensation for each of the symbols.

Alternatively however the compensation may be predetermined based on prior experimentation, simulation or analytical calculation. Or as another possibility that does use adaptation, the adaptive filter may be configured to first converge to the optimal compensation, then disable this learning process and use the now-learned compensation values as fixed compensation values.

The inventors have also determined that the distortion in each symbol is a function of the preceding data, i.e. the data is subject to inter-symbol interference. The injected symbols are typically filtered before transmission (wherein transmission means superimposing symbols on the LED-current). This filtering could be the result of any one or more of a number of potential components in any given implementation, whether an explicit filter or an inherent filtering effect of another component (for instance a digital-to-analogue converter at the output of the current controller will have an inherent filtering effect). Whatever the cause, frequencies above the cut-off frequency of the filter are removed, whilst frequencies below the cut-off frequency of the filter are attenuated. As a result the shape of the transmitted symbols will change within the first symbol period and spread out over the subsequent symbol periods.

To address this, in embodiments the compensation filter is configured to apply said compensation by: determining a respective distortion for each possible logical transition allowed between at least adjacent pairs of symbols (the symbols of said sequence each being selected from amongst a discrete set according to an encoding scheme allowing certain transitions between symbols); and for each presently-transmitted one of the symbols in said sequence, determining the transition into the present symbol from at least one adjacently preceding symbol, and applying the respective compensation for the respective transition to the present symbol.

Preferably the compensation is based on individual feedback measurement for each respective transition.

Hence in embodiments the compensation filter takes the form of an adaptive filter configured to adaptively determine the respective compensation for each of said transitions based on the feedback of the current measurement.

Alternatively the determination of the compensations to apply for the different possible transitions may comprise looking up the respective compensation for each transition from a list of predetermined values, having been evaluated beforehand by experimentation, simulation or analytical calculation.

In a preferred embodiment the symbols of said sequence are each selected from amongst a discrete set according to an encoding scheme; and the compensation filter is configured to apply said compensation for each presently-transmitted one of the symbols in said sequence, determine the transition into the present symbol from at least one adjacently preceding symbol, and apply the respective compensation based at least on the respective transition to the present symbol. In this manner this embodiment may mitigate inter-symbol interference by taking into account and subsequently compensating for distortions caused by respective transitions. Like in the previous embodiment, the compensation filter in this embodiment could be adaptive and could make use of individual in-situ current measurement, optionally by performing a measurement only at start-up, or periodically/intermittently, thereafter relying on the determined compensation values or continuously. More alternatively the determination of the compensations for the different possible transitions may comprise using pre-determined values, either acquired through experimentation, i.e. measurement, simulation or by means of analytical calculation.

Further, although preferred, it is not necessary in all possible embodiments that the compensation is dependent on the history of one or more logical transitions into the present symbol (i.e. compensates for inter-symbol interference). As a first approximation, the compensation filter may instead base its compensation only on knowledge of the individual present symbol to which the compensation is being applied. Though this would not account for the effects of inter-symbol interference, it would still go some way toward compensating for the distortion introduced by the basic fact of the coded light injector being included inside the primary control loop which regulates dim level. I.e. in the first instance the main aim is remove the coded light symbols from the measured LED current.

The compensation filter knows what symbol is going to be transmitted next. Just after transmission, it measures the residue current of this symbol in the LED-current. If it uses this compensation in the next occurrence of the same symbol, the compensation may not be quite right as the compensation value is not only dependent on the last transmitted symbol, and to a decreasing extent on all preceding transmitted symbols going back in time. Hence the accuracy of the compensation increases with the amount of history taken into account, but as a first approximation it is still of some benefit to correct only based on knowledge of the present symbol.

In further embodiments, the adaptive filter may be configured to disable the adaptation once converged on a respective result for each symbol.

In embodiments, said compensation may correct an offset of each symbol.

Alternatively or additionally, said compensation may correct a waveform shape of each symbol.

In embodiments the current is controlled, modulated, measured and compensated in terms of its amplitude. Alternatively the current may for example be controlled, modulated, measured and compensated in terms of its duty cycle in a pulse width modulation scheme.

In embodiments, said illumination source may take the form an LED-based illumination source comprising one or more LEDs.

In embodiments, the current measurement circuitry may comprise a current feedback filter arranged to smooth the current measurement.

In embodiments, the current controller and coded light injector may be implemented in software arranged to run on one or more processing units of the driver circuitry, whilst said power circuitry is implemented in dedicated hardware circuitry.

According to another aspect disclosed herein, there is provided a method comprising providing the compensation filter by means of only a software upgrade, not a hardware upgrade, to a pre-existing device already comprising the current controller, power circuitry, current measurement circuitry and coded light injector.

According to another aspect disclosed herein there is provided method of controlling a current flowing through an illumination source, the method comprising: taking a current measurement of the current flowing through the illumination source; outputting a current control signal to power circuitry driving the current through the illumination source, in order to control the current flowing through the illumination source, and thereby control an amount of illumination emitted by the illumination source; adjusting the current control signal based on an error signal representing a comparison between an input set-point and the current measurement fed back from the current measurement circuitry, in order to thereby keep said current substantially steady at a level specified by said set-point; modulating the current control signal prior to supply to the power circuitry, in order to cause a sequence of data symbols to be modulated into the current flowing through the illumination source, and to thereby cause the sequence of data symbols to be embedded in the emitted illumination; and applying a compensation to the error signal, to at least partially remove an effect of a distortion of the current measurement caused by the modulation of the data symbols into said current.

According to another aspect disclosed herein there is provided a computer program product for controlling a current flowing through an illumination source, the computer program product comprising code embodied on computer-readable storage and/or being downloadable therefrom, being configured so as when run on one or more processing units to perform the steps of the above method.

BRIEF DESCRIPTION OF THE DRAWINGS

To assist understanding of the present disclosure and to show how embodiments may be put into effect, reference will be made by way of example to the accompanying drawings in which.

DETAILED DESCRIPTION OF PREFERRED EMBODIMENTS

Figure 1:
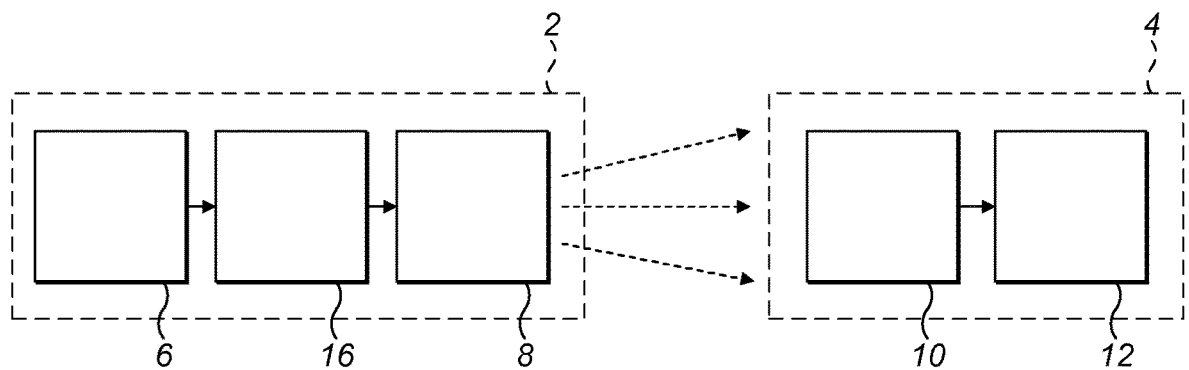
FIG. 1 is a schematic block diagram of a system comprising a coded light transmitter and receiver.

FIG. 1 gives a block diagram of a communication system comprising a transmitting device 2 arranged to emit visible light including embedded data, and a receiving device 4 arranged to receive the light emitted by the transmitting device 2 and detect the data embedded in the light. In embodiments the transmitting device 2 may take the form of a luminaire arranged to illuminate an environment such as a room or outdoor space, and also to encode data into the illumination it emits. However in alternative embodiments the transmitting device 2 may take any other form, such as a dedicated coded light emitter. The receiving device 4 may also take any suitable form, for example a mobile user terminal such as a smartphone, tablet or laptop having a built-in camera or other photo-sensor (e.g. photodiode) and installed with a suitable application ("app") for detecting the coded light signal in the light received by the camera or photosensor.

The transmitting device 2 comprises a light source 8, a driver 16 and an encoder 6 operatively coupled to the light source 8 via the driver 16. In embodiments the light source 8 takes the form of an LED-based light source, comprising an LED or string of LEDs. Alternatively however the light source 8 could take another form such as a filament bulb. Either way, the encoder 6 is arranged to modulate the current flowing through the light source 8 via the driver 16 (to be discussed shortly) and thereby modulate the level of the emitted light, i.e. to modulate the intensity of the emitted light. In the case of an LED or string of LEDs, the power of the emitted light is a function of the current flowing through the LED(s). E.g. in in typical LED light source the power of the emitted light is predominantly proportional (the linear term in the relationship is the predominant term). The encoder 6 is therefore arranged to control the light source 8 to transmit data to the receiving device 4 embedded in the light emitted by the light source 8. By way of example the following will be described in terms of an LED-based light source 8

The receiving device 4 comprises a light sensor 10 for receiving and sampling the light emitted by transmitting device 4, and a decoder 12 operatively coupled to the light sensor. The light sensor 10 may take the form of a camera such as a rolling-shutter camera (such as in the case of a smartphone or tablet) or a global shutter camera. Alternatively the light sensor 10 may take another form such as a dedicated photocell. Either way, the decoder 10 is arranged to receive the samples captured by the light sensor 10 and to process the received samples in order to decode the data that has been modulated into the received light. Various techniques for detecting coded light using a rolling-shutter camera or other form of light sensor are in themselves known to a person skilled in the art.

In embodiments each of the encoder 6 and the decoder 12 may take the form of software stored on one or more memory devices of the transmitting device 2 and receiving device 4 respectively, arranged to run on one or more processors of the transmitting device 2 and receiving device 4 respectively (memory and processors not shown). However, it is not excluded that one or both of these components could instead be implemented wholly or partially in dedicated hardware circuitry, or hardware configurable or reconfigurable circuitry such as a PGA or FPGA, or a combination of hardware and software.

Figure 2:
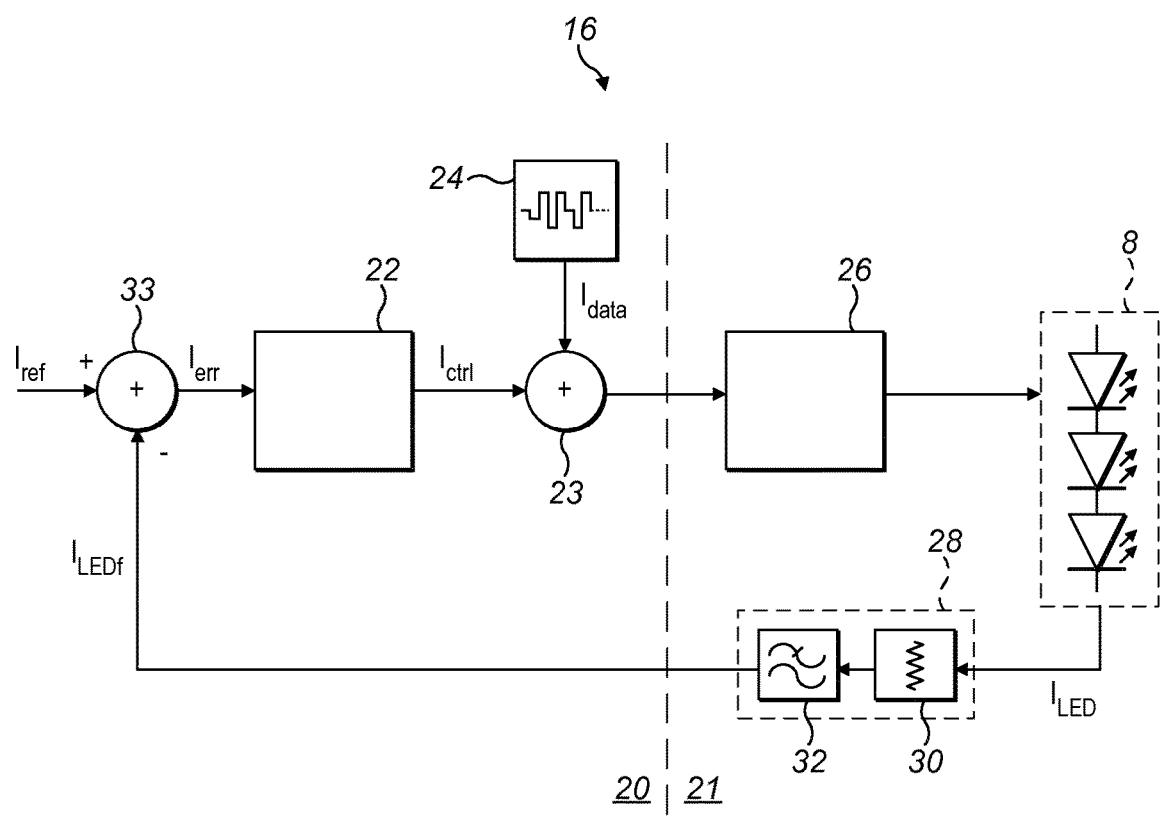
FIG. 2 is a schematic block diagram of a lighting device for modulating the light it emits in order to produce coded light.

FIG. 2 is a schematic block diagram of logic comprised by the driver 16. The driver 16 comprises a current controller 22, power circuitry 26, and current measurement circuitry 28, an adder 23, and a subtractor 33. The driver 16 is coupled to a coded light injector 24 which comprises the encoder 6. The current measurement circuit 28 comprises a current sensor 30 and a current feedback filter 32. In embodiments the current controller 22, coded light injector 24, adder 23 and subtractor 33 may be implemented in the software domain, i.e. in software stored on one or more embedded memory units of the driver 16 and arranged to run on one or more processing units; whilst the power circuitry 26 and current measurement circuit 28 (as well as the LEDs 8 themselves) may be implemented in the hardware domain 21, i.e. in dedicated hardware circuitry. However, a hardware implementation of some or all of the current controller 22, coded light injector 24, adder 23 and/or subtractor 33 is also not excluded. And/or, a software implementation of the current feedback filter 32 is also not excluded.

By whatever means implemented, the current controller 22 is configured to output a current control signal $I_{ctrl}$ representing a current with which to drive the LEDs 8. The coded light injector 24 is configured to output a data signal $I_{data}$ representing an amount by which the LED current is to be modulated to represent the data to be transmitted. The current control signal $I_{ctrl}$ is supplied to a first input of the adder 23, and the data signal $I_{data}$ is supplied to a second input of the adder 23, where the two signals are added together. The result of this is supplied to the input of the power circuitry 26, which drives the LEDs 8 with a corresponding LED current $I_{LED}$, i.e. a current with a base dim level (illumination contribution) as specified by the current control signal $I_{ctrl}$ but modulated with a time-varying data component as specified by the data signal Idata. The power circuitry 26 comprises power stage hardware including PWM waveform generators and gate drivers for power switches.

Further, the current sensor 30 of the current measurement circuitry 28 is arranged to take a measurement of the current ILED presently flowing through the LEDs 8 and feed this back through the current feedback filter 32 toward the input of the current controller 22. The reading output from the current feedback filter 32 is labelled $I_{LEDf}$ herein. The subtractor 33 is arranged to subtract this fed-back current measurement $I_{LEDf}$ from a set-point signal $I_{ref}$ specifying a desired current level, to produce an error signal $I_{err}$ representing the different between the two. This error signal $I_{err}$ is input to the current controller 22, which is configured to produce the current control signal $I_{ctrl}$ based on the error signal $I_{err}$ in order to keep the current flowing through the LEDs 8 at a substantially steady level. "substantially" steady herein means constant except for the intentional modulations due to the coded light data. The set-point $I_{ref}$ corresponds to a desired dim-level, which may be a user-specified dim level, or an automated dim-level output by an automated function (e.g. based on daylight or occupancy sensor or based on a predetermined light schedule).

Thus the circuit of FIG. 2 provides a feedback loop which keeps the overall dim level substantially constant.

In practice the coded light injector 24 has to be placed after the current controller 22, i.e. to modulate the current control signal Ictrl output by the current controller 22, because if the modulation was instead applied at the input of the current controller 22 then the current controller 22 would not be able to react responsibly enough to the fast modulations in the data signal. The coded light injection is therefore placed inside the feedback loop. However, this creates another problem. The current feedback filter 32 is a low-pass filter, e.g. with an upper cut-off frequency of 1592 Hz. It is included to try to smooth out the data modulations from the fed back current level $I_{LEDf}$ so as to feed back only the underlying DC level (wherein the smoothing comprises anti-aliasing filtering). But in practice, the filter 32 will not be able to completely remove these modulations from the feedback $I_{LEDf}$. Therefore the signal $I_{err}$ which the current controller 22 uses as its reference will also contain some modulations. This in turn causes distortion in the waveforms of the data symbols as these are each represented relative to the DC current which the current controller 22 is trying to maintain.

Figure 3:
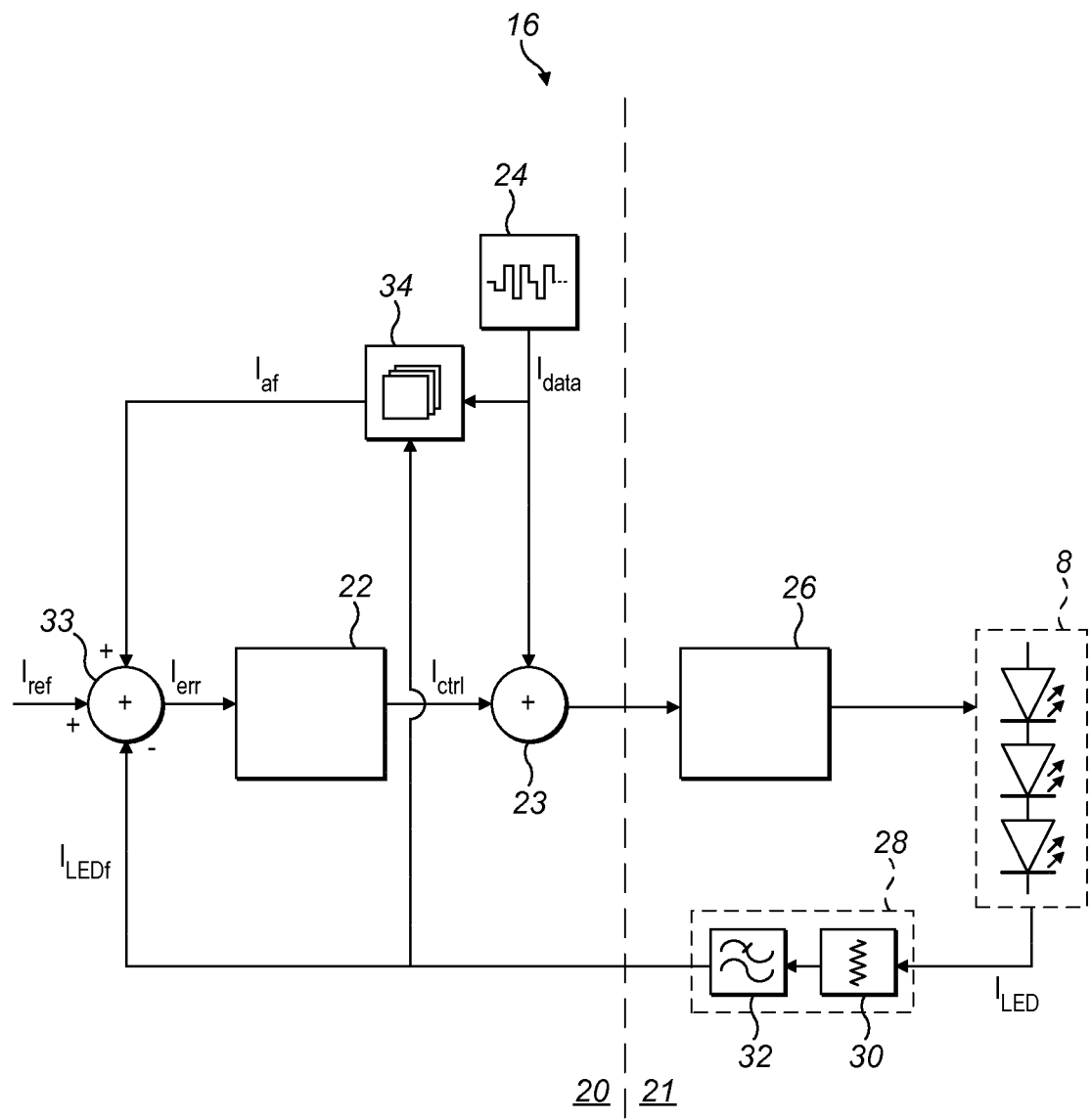
FIG. 3 is a schematic block diagram of the device of FIG. 2 but including an adaptive filter for compensating for distortions in the coded light signal.

FIG. 3 shows means to address this issue in accordance with embodiments of the present disclosure. The arrangement shown in FIG. 3 is substantially similar to that of FIG. 2 except for the inclusion of a compensation filter 34. The compensation filter 34 is arranged to receive an indication of the presently-transmitted symbol of input data $I_{data}$, and based thereon to produce a correction to be applied at the input to the current controller 22, i.e. to the error signal $I_{err}$, to compensate for the distortion caused in that symbol by the data appearing in the feedback loop.

The corrections for each possible symbol value, or set of symbol values, may be predetermined based on experimentation, simulation or analytical calculation. More preferably however, the compensation filter 34 takes the form of an adaptive filter which determines the correction to be applied for each symbol based on the actual measure $I_{LEDf}$ of the current experienced through the LEDs 8 compared to the expected current representation of that symbol (i.e. compared to the adaptive filter's predetermined knowledge of what the symbol should look like). Therefore the adaptive filter 34 is arranged in a second feedback loop in addition to the main current control feedback loop described in relation to FIG. 2.

Furthermore, the inventors have determined that the distortion experienced in any symbol is not just a function of the individual, momentary symbol value itself, but also on a history of one or more of the adjacently preceding symbol sin the data sequence $I_{data}$. That is to say, the data is subject to inter-symbol interference (ISI). As mentioned, ISI is a phenomenon normally associated with the transmission medium or receiver, but the inventors have identified that in fact ISI can also be introduced in the transmitter 2 itself due to the above-described disturbances in the current control feedback loop. Therefore to address this issue, in preferred embodiments the correction applied by the compensation filter or adaptive filter 34 to each presently-transmitted symbol is a function of the history of the one or more preceding (already-transmitted) symbols in the data sequence $I_{data}$. I.e. the adaptive filter 34 also takes into account which symbol transfer was last issued (e.g. −0,5→1, −1→+1, . . . )

A given encoding scheme (e.g. Manchester coding, or Ternary Manchester) will have a discrete set of symbols each represented (at least in the case of coded light) by a different respective gradation or waveform in the LED current $I_{LED}$. Further, a given encoding scheme will also have a discrete set of allowed transitions between symbols (which may be smaller than or equal to the total number of theoretically possible permutations of symbol). For each possible transition into each possible symbol allowed by the encoding scheme being used, the adaptive filter 34 is configured to determine a different respective correction to the present symbol. Preferably this correction is learned individually for each combination of present symbol and adjacently preceding symbol (or even transition histories going back by more than one symbol into the past).

The compensation filter or adaptive filter 34 is preferably implemented in the software domain 20, i.e. in the form of code stored on one or more memory units and arranged to run on one or more processing units. For instance, the compensation filter or adaptive filter 34 may be added as a software upgrade to a pre-existing luminaire 2 already having coded light capability. However, a hardware implementation is not excluded, e.g. in dedicated hardware or configurable or reconfigurable hardware such as a PGA or FPGA.

Note that where it is referred herein to a measure, amount or level of a current, or such like, this may refer to any property of the current affecting the light level emitted by the illumination source 8 (e.g. LEDs). For instance this could be the amplitude of the current, or the duty cycle in a pulse width modulation (PWM) scheme. By way of illustration examples below are discussed in relation to an amplitude modulation based scheme.

An example implementation of the arrangement shown in FIG. 3 will be discussed in more detail shortly with reference to FIGS. 7 to 24. However first, by way of illustrative context, an example encoding scheme will be described with reference to FIGS. 4 to 6. It will be appreciated that this is not limiting and more generally the techniques disclosed herein can be used to correct for the levels or shape of any symbols in any encoding scheme capable of being used in coded light.

Example Encoding Scheme

Figure 4:
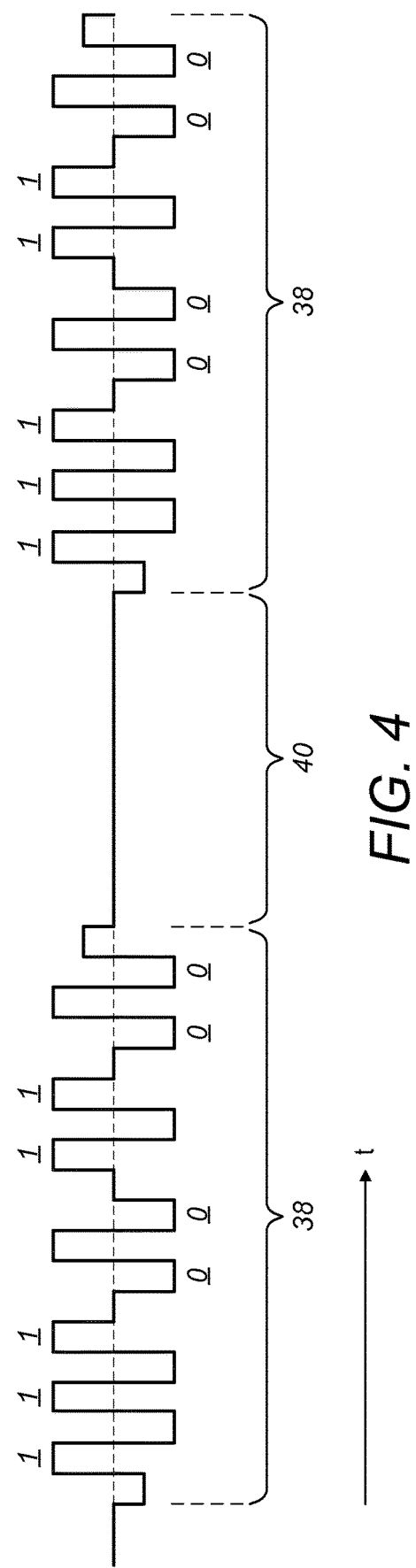
FIG. 4 is a sketch of an example coded light signal.

As shown by an example data sequence in FIG. 4, in embodiments coded light uses a five-level DC-free packet coding format referred to as ternary Manchester encoding (see the next paragraph regarding the DC free nature of the code). The data is transmitted in the form of packets 38 interspersed in time by an idle period 40 between each consecutive pair of packets. During the idle period 40 in between packets, the power consumed by the LEDs 8 is equal to the constant power delivered by the driver.

Note also that an idle period 40 between packets is not necessary in all possible embodiments, in which case it can still be said that the code is DC free in that regardless of the data content there are always an equal number of positive and negative channel symbols per packet (elementary symbols $T_C$). I.e. the code is not data dependent. As can be seen in FIG. 4, in the case where the data is packetized then in each packet the total of the symbol values in the packet always add up to zero, e.g. because there are the same number of +1 channel symbols as −1 symbols and the same number of +½ channel symbol as −½ symbols, or because a leading +½ and a trailing +½ will be compensated by one more −1 s than there are +1 s, or such like (more details of this symbol set to be discussed shortly). Or even if the data was not packetized, it can be seen the average symbol level is always the same for any two adjacent data bits regardless of whether 00, 01, 10 or 11.

The significance of a code being DC free is that it mitigates visible flicker (e.g. consider a situation where the average light output was alternating between one level during the packets 38 and another level during the idle periods, or if the average light level was fluctuating depending on the data content being sent at the time, this would cause the light to flicker at visibly low frequency). In general other DC free codes also exist which have the property of being non data dependent, in that that the average signal level per packet is always the same regardless of the content, and is equal to the output level during idle periods between packets; or in the case of no idle periods, that the average signal level over a certain small predetermined number of data bits or even a single data bit is the same regardless of the content. The teachings herein are applicable to any such codes or others, but by way of example the following will be described in terms of the ternary Manchester code.

By way of an example coding scheme, the ternary Manchester scheme will now be discussed in more detail with reference to FIGS. 5 and 6.

The encoder 6 is arranged to receive non-encoded ("raw") data content to be encoded from a data source such as an application, and to encode this into an encoded stream of symbols of different symbol values (interspersed by idle periods 40 between packets 38). For example in a three-level code the symbols values are selected from amongst a set of symbol values −1, 0, +1; or in a five-level code as in ternary Manchester, the symbol values are selected from amongst a set of symbol values −1, −½, 0, +½, +1. The encoder outputs these in the form of duty cycle values (e.g. 0.70, 0.75, 0.80, 0.85, 0.90) for pulse width modulating the current through the LED light source 8 via the switch 22. The modulator 20 is arranged to receive this encoded signal and apply the pulse width modulation to the LED light source accordingly in accordance with the specified duty cycle values, and thereby modulate the data into the light emitted by the light source 8.

Ternary Manchester now forms a part of the state of the art and is thus known to a skilled person, but it is summarised again here for completeness. At the encoder 6, each data bit to be transmitted is mapped to a composite channel symbol in the form of a respective unit pulse. According to this scheme, there are two possible units, in the form of positive and negative "hat" functions as shown in FIG. 5. The pulse mapped to a data bit of value 1 is shown on the left hand side of FIG. 5, and the pulse mapped to a data bit of value 0 is shown on the right hand side of FIG. 5 (or the opposite mapping could just as well be used). A data bit is a bit of actual information to be conveyed in the transmission, sometimes referred to as "content data" or "user data" (even if not explicitly created by a user). The data bit period is labelled $T_D$ in FIG. 5, with the boundaries between user bit periods shown with vertical dashed lines.

Each unit pulse comprises a sequence of elementary channel symbols of length $T_C$ in time, smaller than the data bit period. Each elementary channel period consists of just one of the elementary levels that the coded signal can take, and is not alone sufficient to convey data (information) without being combined into a composite channel symbol. Hence each composite pulse of length $T_D$ is the smallest or most fundamental unit of information (user data) that can be conveyed on the channel using the coding scheme in question, and the elementary channel symbols of length $T_C$ are even smaller than this.

In the ternary Manchester code, each unit hat function (each composite symbol) comprises a sequence of three elementary channel symbols of length $T_C$ in time, each half the length of the data bit period $T_D$ ($T_D=2T_C$). The three elementary channel symbols for a respective data bit are contiguous, with the middle of the three being located at the centre of the respective data bit period, so that the adjacent first and third elementary channel symbols straddle the beginning and end boundaries of the data bit period $T_D$ respectively by half an elementary channel period $T_C$ either side.

Figure 5:
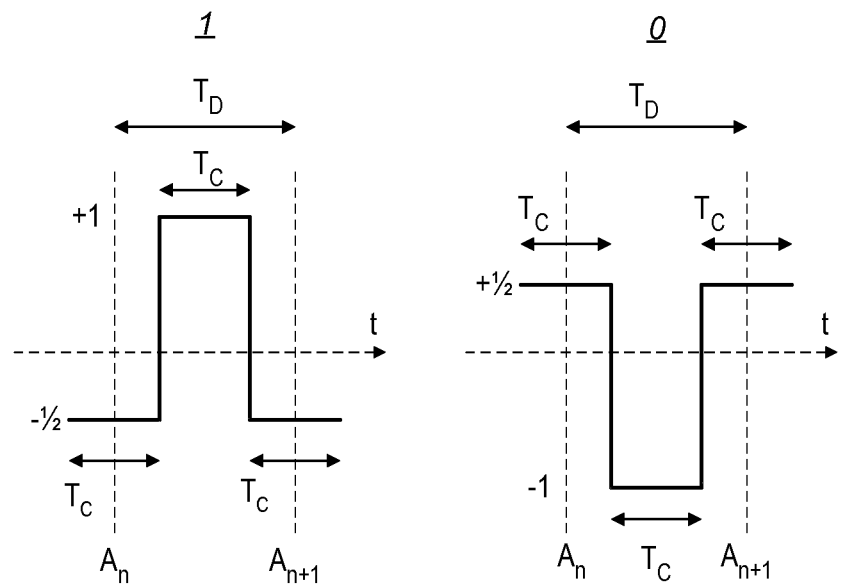
FIG. 5 schematically illustrates a ternary Manchester coding scheme.
Figure 6:
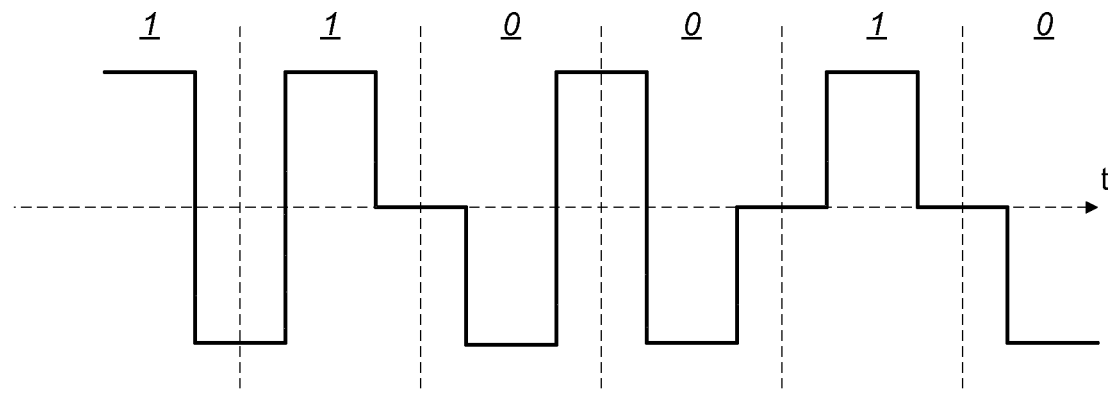
FIG. 6 schematically illustrates an example signal coded using ternary Manchester.

For a data bit of value 1, this is mapped to the positive hat function shown on the left of FIG. 5. The positive hat function comprises: a first elementary channel symbol of height −½ centred on the beginning (earlier) boundary of the respective data bit period $T_D$, followed by second (middle) elementary channel symbol of height +1 being centred on the respective data bit period $T_D$, followed by a third elementary channel symbol of height −½ centred on the end (later) boundary of the respective data bit period $T_D$. The "height" at this stage may be represented in any suitable terms such as a dimensionless digital value (ultimately to be represented by the modulated intensity).

For a data bit of value 0, this is mapped to the negative hat function shown on the right of FIG. 5. The negative hat function comprises: a first elementary channel symbol of height +½ centred on the beginning (earlier) boundary of the respective data bit period $T_D$, followed by second (middle) elementary channel symbol of height −1 being centred on the respective data bit period $T_D$, followed by a third elementary channel symbol of height +½ centred on the end (later) boundary of the respective data bit period $T_D$.

To create the encoded bitstream to be transmitted, the hat functions of adjacent user bits are added to one another, offset by the times of their respective bit periods $T_D$. Because the hat functions overlap across the boundaries between data bit periods, the functions add in the overlapping regions between adjacent data bits. That is, the hat functions are joined along the boundaries, so the earlier boundary An of one data bit period is joined with the later bit boundary An+1 of the preceding adjacent data bit period, with the height of the signal being summed where the two adjacent pulses overlap. An example of a resulting sequence of channel symbols in the time domain is shown in FIG. 6. Another example is shown in the above-mentioned FIG. 4.

Where two adjacent data bits are of value 1, this means the two overlapping elementary channel symbols of height −½ add to a height of −1. Where two adjacent data bits are of value 0, the two overlapping elementary channel symbols of height +½ add to height +1. Where two adjacent data bits are of different values, the two overlapping elementary channel symbols of height +½ and −½ add to 0. Thus in the encoded stream, each user bit period (each unit pulse of information) takes the form of either a positive pulse of a rectangular wave when a user bit of value 1 is neighboured on either side by two adjacent user bits of value 1, or a negative pulse of a rectangular wave when a user bit of value 0 is neighboured by two adjacent user bits of value 0, or an uneven pulse of one or four possible configurations with straight edges when at least one of the adjacent user bits is different. Note also that at the edges of a packet, the +½ and −½ levels remain (e.g. see FIG. 4).

Conventionally, the resulting signal (e.g. that of FIG. 4 or 6) is then converted into a variation in the modulated intensity of the signal output by the transmitting light source, such as by modulating the amplitude or PWM duty cycle of the LED current. Thus, elementary channel symbol −1 may be represented by a low light output level, the elementary channel symbol +1 may be represented by a high output light level, and the elementary channel symbol 0 may be represented by an intermediate light level between the high and low. The levels representing the +½ is equally spaced (i.e. half way) in between the +1 and 0 levels, and the level representing the −½ is equally spaced between the 0 and −1 levels.

The ternary Manchester code can be advantageous as it provides a smoother transition when the data bits change value than an old-fashioned binary Manchester code, and results in a spectrum in the frequency domain that is more suppressed around low frequencies the human eye is susceptible to perceive light variation. The less variation in the low frequency range, the better the quality of light. Particularly, ternary Manchester is not only DC free, but $DC^2$ free in that, in the frequency domain, not only does the distribution (energy vs frequency) go to zero at zero hertz, but also the gradient goes to zero at zero hertz.

Another equivalent way of describing the ternary Manchester scheme is that the modulation is composed of a sequence of bit symbols interleaved by a merging symbol leading into each bit symbol and a merging symbol leading out of each bit symbol and into the next temporally adjacent bit symbol, with each bit symbol and each merging symbol being an elementary channel symbol of duration $T_C$. Each bit symbol may be either a +1 represent a logic 1 or a −1 to represent a logic 0 (or vice versa); while the merging symbol may be either a −1, −½ or 0 leading into or out of a bit symbol 1, or a +1, +½ or 0 leading into or out of a bit symbol of 0. See for example the bit values 0 and 1 labelled in FIG. 4. The elementary channel symbols labelled 1 or 0 represent bits of data, and the elementary channel symbols in between are merging symbols which depend on the two temporally adjacent bits that they merge between. So in a packet, the first elementary symbol is a merging symbol, the second is a bit symbol, the third is a merging symbol, the fourth is a data symbol, and so forth (all odd elementary symbols are merging symbols and all even elementary symbols are bit symbols).

Embodiments disclosed herein relate to the problem of inter-symbol interference (ISI), from which the system in FIG. 3 suffers for example. The ISI occurs between elementary symbols $T_C$. ISI is a common phenomenon in communication systems which negatively impacts the ability of the decoder 12 to distinguish the symbols in the received message. Unlike most communication systems however, in the present case the ISI to be compensated for is caused at the transmit side, instead of caused by the channel or receiver.

Example Use Case

Figure 7:
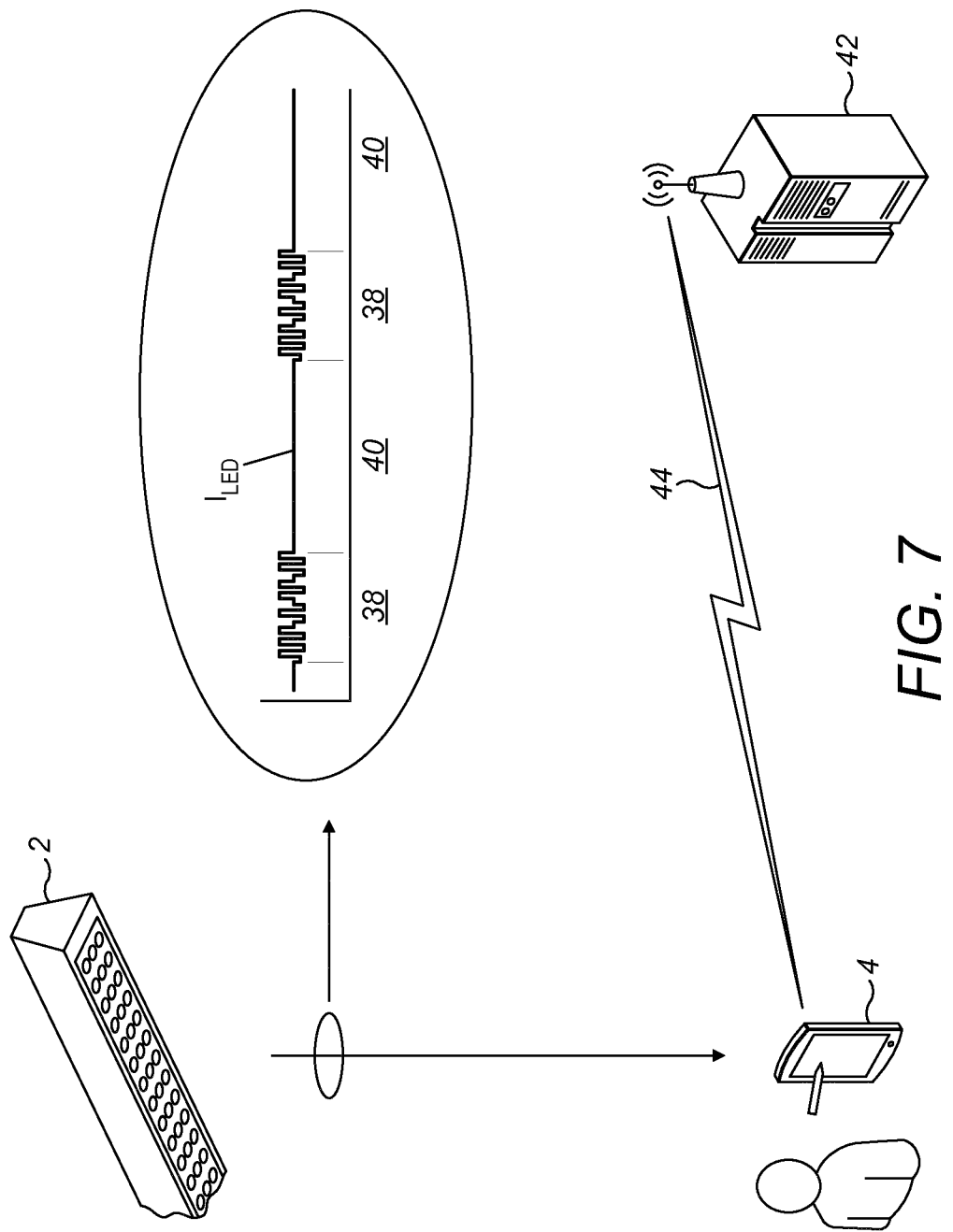
FIG. 7 schematically illustrates an example application of coded light to indoor positioning.

FIG. 7 illustrates an application of a digitally controlled LED driver to indoor positioning. In this case the receiving device 4 takes the form of a mobile user terminal carried about the person of a human user, and the emitting device 2 may take the form of a luminaire. The aim is to locate persons in a building based on known positions. The position of a person is determined by the position of at least one luminaire by which he/she is illuminated. Each of the luminaires continuously transmits its position or an ID of itself by means of coded light. The person's user terminal 4 runs an application that can detect coded light messages and thereby determine the location of the, or each, detected luminaire (either by the location being explicitly included the coded light message, or more commonly by using the received ID to look up the location in a location database stored on a server 42, wherein the location database maps luminaire IDs to their respective locations, and the user terminal 4 contacts the server 42 to access this database via a suitable wireless connection 44 such as a Wi-Fi or Bluetooth connection). Given location of a luminaire, the application running on the user terminal 4 can approximate that the location of the device 4 (and therefore its user) is roughly that of the nearby luminaire, or given the locations of multiple nearby luminaires, the application can determine the location of the user device 4 more accurately based on a suitable localization technique such as triangulation, trilateration, multilateration, fingerprinting, and/or dead-reckoning.

It will be appreciated that this is just one example application of coded light. For instance, other examples include the ability to provide location based information (e.g. the user terminal 4 looks up a location specific advertisement of information about an exhibit in the present room based on the ID in the currently experience illumination).

The symbol transfer rate of coded light in an application such as indoor positioning may for example be 1 kHz, 2 kHz or 4 kHz. Coded light is implemented by superimposing small light intensity changes on the illumination. The size of a coded light pulse is determined by the "modulation depth" which is typically set to 10% of the nominal LED current. Note that the light intensity is linear with the LED-current. Note further that coded light is not visible for the human eye if the sum of the superimposed light intensity changes is equal to 0. Thus the coded light messages are not visible as flicker or stroboscopic light artefacts, meaning that amplitudes and frequencies are below visibility threshold limits for human eyes.

Example Implementation of Current Control Scheme

The LED driver 16 typically operates an LED-based light source 8 comprising a string of LEDs in series or a plurality of such strings in parallel with one another. The LED driver 16 consists of an input power stage and an output power stage. The input power stage typically consists of a boost converter acting as power factor corrector (PFC) and has a digital feedback controller. The output power stage is typically implemented by a synchronous buck converter. The buck converter consists of a digital closed-loop LED current feedback controller 22. This is an example of the feedback loop illustrated in FIG. 2.

Figure 8:
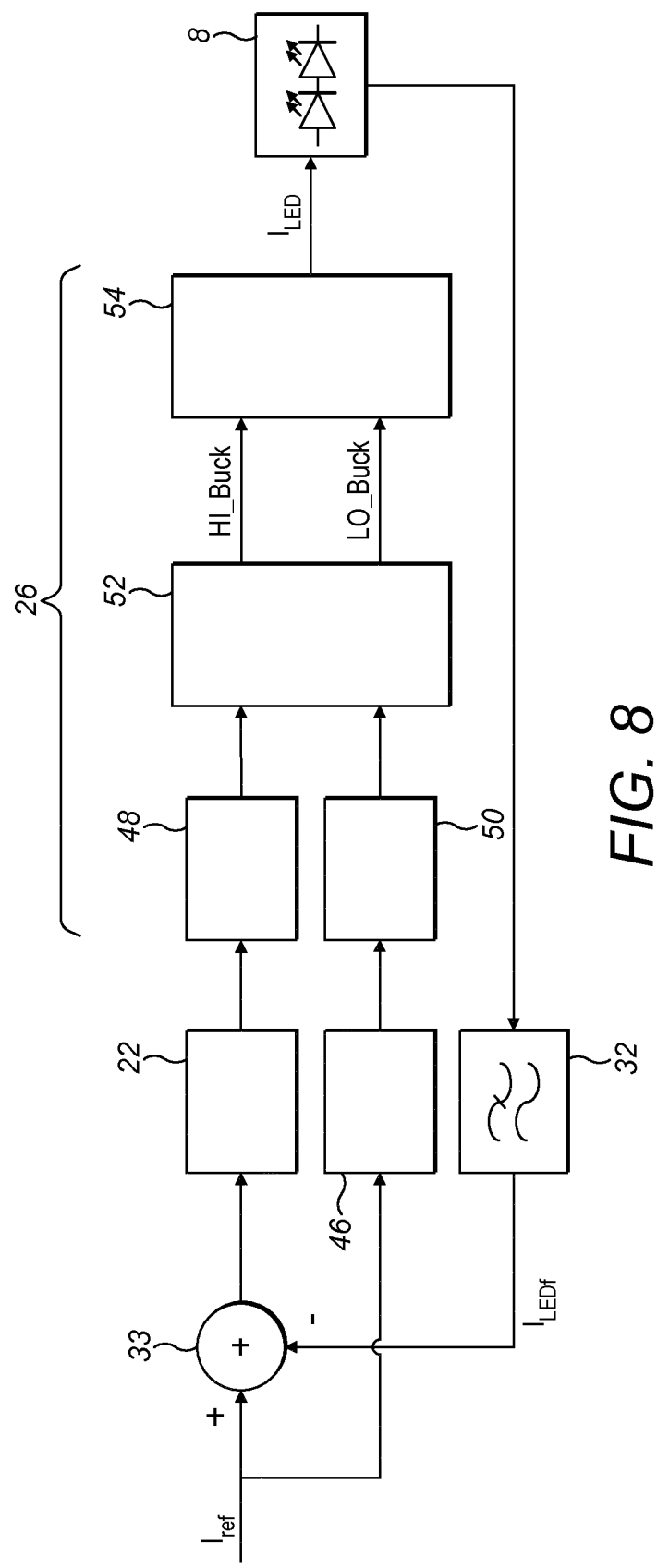
FIG. 8 is a schematic block diagram of a buck output power stage driving a LED load, plus associated controller elements.

FIG. 8 is a block diagram of a buck output power stage driving a LED load 8, including controller elements 22, 26, 33, and also a curve block 46. The control elements may be implemented in the form of code running on an embedded microcontroller of the driver 16. The power circuitry 26 comprises a hardware cycle-by-cycle current control block 52, a power stage 54, a first digital to analogue converter (DAC) 48 and a second DAC 50. The first DAC 48 is arranged to receive the digital current control signal $I_{ctrl}$ from the current controller 22 and to output an analogue version of this to a first input of the hardware cycle-by-cycle current control block 52, which in turn outputs a signal HI_buck to a first input of the power stage 54 based thereon. The second DAC 50 is arranged to receive a digital signal from the curve block 46 and to output an analogue version of this to a second input of the hardware cycle-by-cycle current control block 52, which in turn outputs a signal LO_buck to a second input of the power stage 54. The power stage 54 delivers a current to the LEDs 8 based on HI_buck and LO_buck.

The particular implementation shown in FIG. 8 is a dual switch hysteretic buck controller. In such an arrangement, block 46 in the lower branch controls the negative peak current of the inductor dependent of the set LED-current. The upper branch 22 controls positive peak current of the inductor. This is a feedback controller. The lower branch controls the negative peak current of the inductor. This is a feed-forward controller. Block 52 contains the comparators and PWM generators (microcontroller peripherals) that generate the gate signals for the switches (FETs). Block 54 contains the electronics that implement a buck converter (level-shifter, switches, inductor, capacitor and other circuits). A hysteretic buck converter drives two switches/FETs that are in a half-bridge configuration. HI Buck is the gate signal of the HI-side FET. LO Buck is the gate signal of LO-side FET. These signals are particular to a dual switch hysteretic buck controller. Block 46 controls the negative peak current level of the inductor. This is a digital controller. The lower DAC 50 converts the digital output of block 46 to an analogue representative that is input to the comparator in block 52. Block 54 implements the hardware of a dual switch hysteretic buck converter, the theory of which will be familiar to a person skilled in the art.

It will be appreciated that the particular implementation of a dual switch hysteretic buck controller as shown in FIG. 8 is given only by way of example. Other suitable current control loops for driving LEDs or illumination source in general will be familiar to a person skilled in the art.

All such control loops will include some form of current controller 22 which guarantees consistent LED current and therefore light output behaviour in the face of variations due to production tolerances (spread in LED forward voltages) and operating conditions (temperature).

The feedback controller 22 of the buck output power stage is executed at equidistant time intervals. To maximize the performance it is preferably executed as fast as possible (depending on micro-controller computing power). For the current generation of micro-controllers used in present lighting applications this execution frequency is between 1 kHz and 6 kHz. However, the bandwidth of the controller 22 is limited to about 500 Hz. As a result, it is not possible to follow fast changes in the LED current by changing the reference current as would be preferred for implementing coded light. The execution frequency of the controller 22 is equal to the sample rate. "Rules of thumb" suggest that the sample rate of a closed-loop system should be about ten to twenty times larger than the bandwidth. The essence is that the micro-controller has not enough power to implement a feedback controller with a bandwidth big enough (close to the code light symbol rate) to follow coded light symbols. Example: if the coded light symbol rate is 2 kHz, the bandwidth of the feedback controller 22 should also be at least 2 kHz, meaning an execution frequency (sample rate) of about 20 kHz to 40 kHz (following the "rule of thumb").

Figure 9:
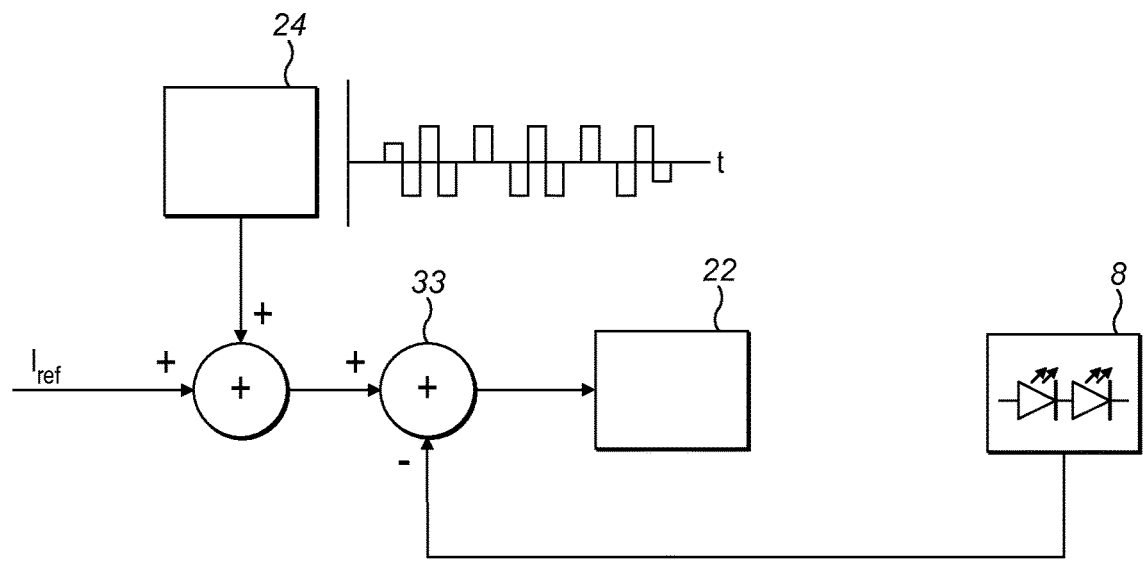
FIG. 9 schematically illustrates, by way of contrast, an ideal coded light control scheme which is not readily achievable in practice.
Figure 10:
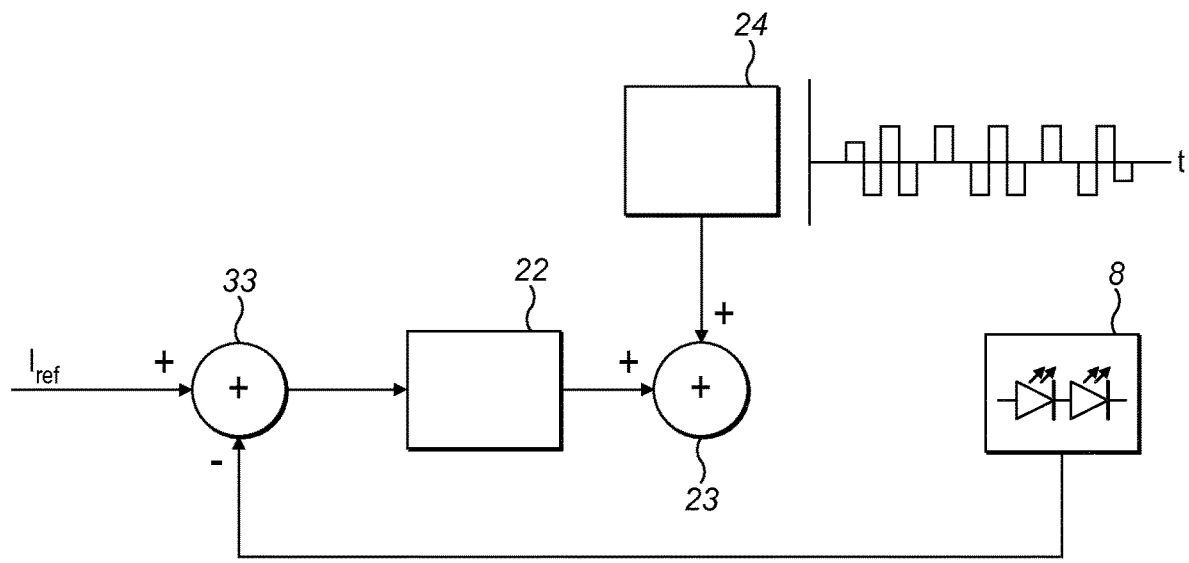
FIG. 10 schematically illustrates a practical coded light control scheme.

FIG. 9 illustrates the ideal (but unachievable) case of placing the coded light injection at the input of the controller 22. Here, coded light is implemented by superimposing small steps in LED-current on the input (reference current) of the current controller 22.

However, in practice, due to the restricted bandwidth of the current controller 22, these steps can be applied but will not be followed. Therefore applying coded light in this way is not possible. This problem is solved by superimposing the coded light steps in LED current on the output of the controller 22, which is the input of the actuator of the power circuitry 26, as shown in FIG. 3 and also in FIG. 10. Applying information in this way is also called feedforward.

Figure 11:
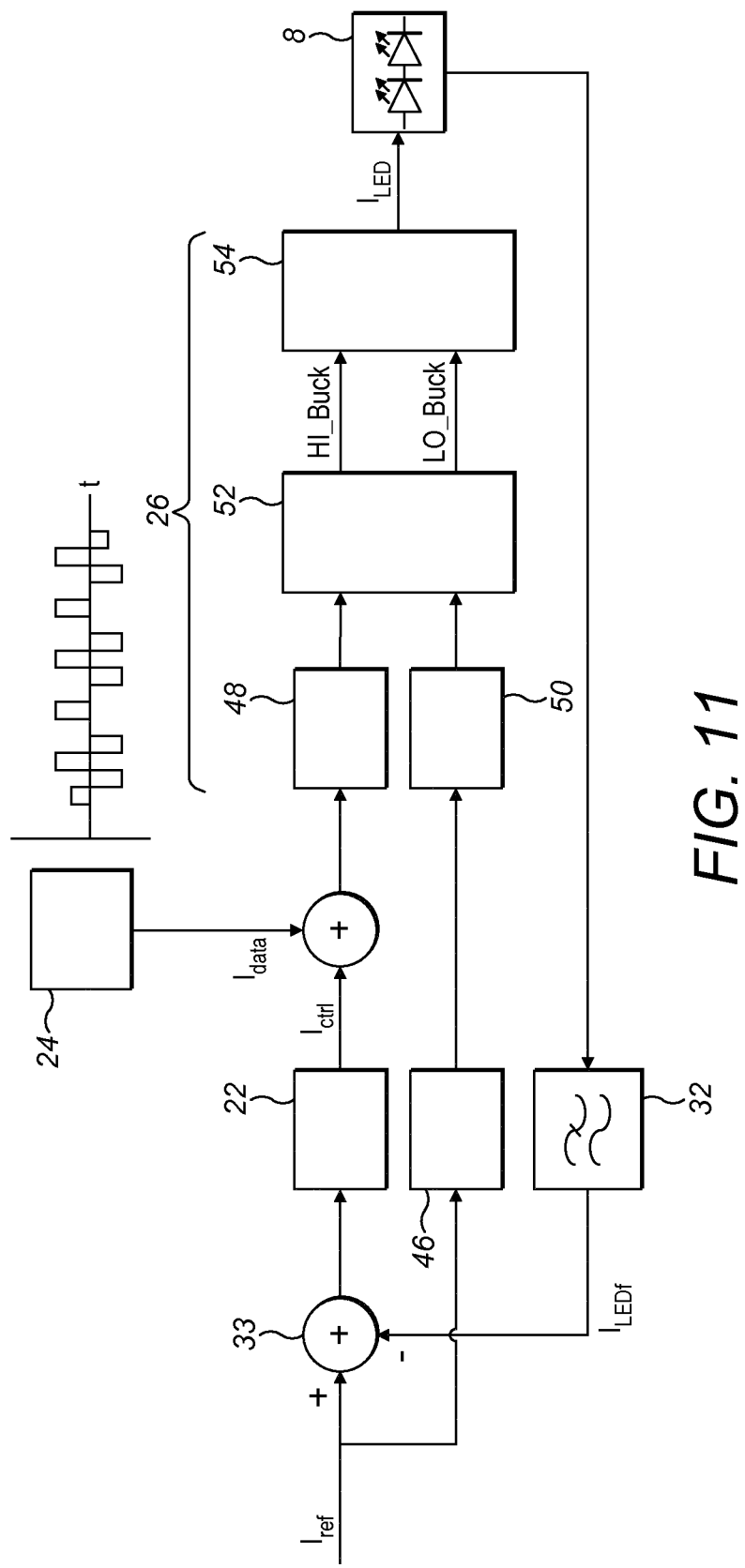
FIG. 11 is a schematic block diagram of an example imlementation of the control scheme of FIG. 10.

The resulting feedforward control scheme is shown in FIG. 11. The arrangement is substantially similar to that described in relation to FIG. 8, but with the data added at the output of the current controller 22, rather than the input.

Figure 12:
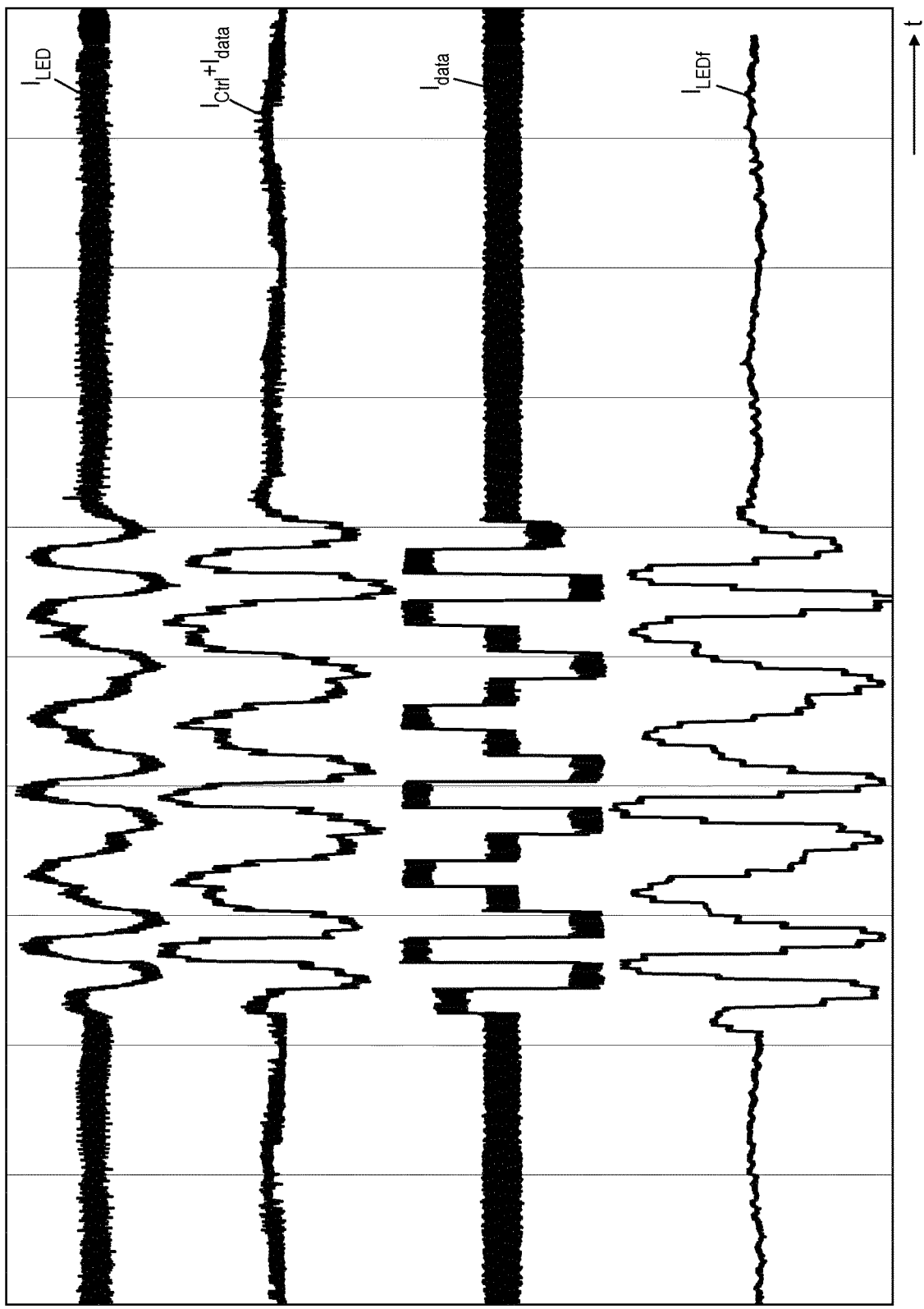
FIG. 12 is a sketch of an oscilloscope trace of various signals from the disturbed coded light control scheme of FIG. 11.

FIG. 12 shows a sample of the signals $I_{LED}$, $I_{LEDf}$, $I_{data}$, and the sum of $I_{data}$ and $L_{ctrl}$. The LED current $I_{LED}$ of the buck output power stage carries the coded light messages. $I_{LEDf}$ is the current measurement fed back from the current feedback filter 32. Ictrl is the current control signal output by the current controller 22, being a digital representation of the current with which to drive the LEDs 8, for controlling the power circuitry 26 to generate the LED current $I_{LED}$ accordingly. $I_{data}$ is the signal output by the coded light injector 24 to represent the amount by which to modulate the output of the current controller 22. See again the description of FIG. 3.

The problem can be solved by suppressing the coded light pulses in the measured LED current $I_{LEDf}$ before it enters the current controller 22. This may be achieved by means of a closed-loop inter-symbol interference compensation algorithm (feed-forward control).

Figure 13:
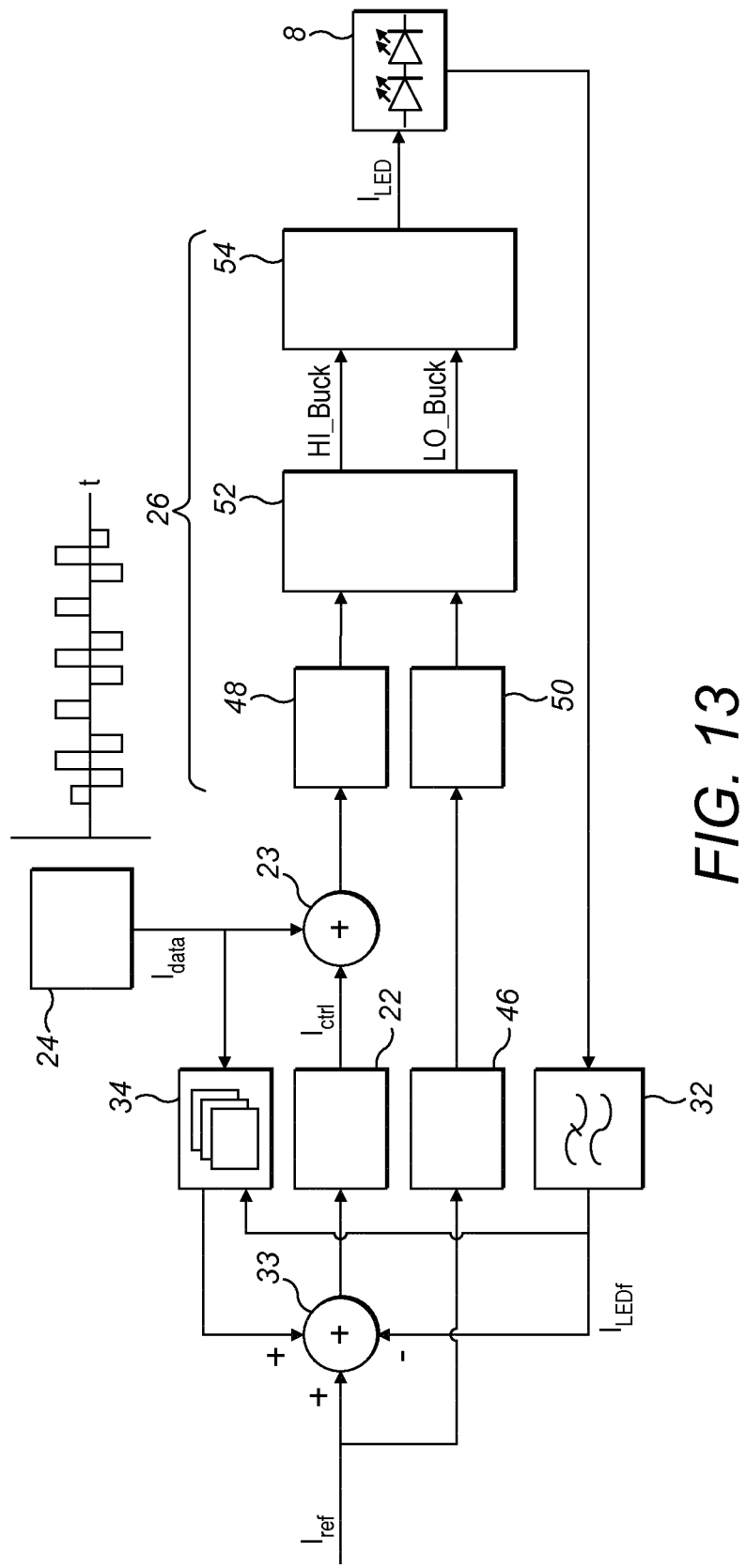
FIG. 13 is a schematic block diagram of the control scheme of FIG. 11 but with inter-symbol interference compensation for measured coded light pulses.

As shown in FIG. 13, the required compensation pulses are predicted by filtering the output of the coded light injector 24. The arrangement is substantially the same as that described in relation to FIG. 8, but with the inclusion of an adaptive filter 34, preferably a software upgrade. The adaptive filter 34 is arranged to receive the same data that is input to the adder 23, and is further arranged to supply an additional additive input to the subtractor 33. Further, the adaptive filter 34 is arranged to receive the current measurement $I_{LEDf}$ fed back from the current feedback filter 32. The adaptive filter uses knowledge of the transmitted data $I_{data}$ to predict how each symbol in the transmitted data stream is expected to appear, and compares this with the actual measurement of the current representing each respective symbol, as determined from the fed back LED current $I_{LEDf}$. Based on this the adaptive filter 34 can produce a correction signal $I_{af}$ to apply to the input to the current controller 22 via the subtractor 33, to at least partially correct for the distortion.

Further, as mentioned, the inventors have found through experimentation that the distortion in the symbols is not only a function of the immediate symbol value, but also the history of past states in the preceding data. Without being bound by theory, the cause is believed to be that the injected symbols are typically filtered before transmission (wherein transmission means superimposing symbols on the LED-current). Frequencies above the cut-off frequency of the filter are removed. Frequencies below the cut-off frequency of the filter are attenuated. As a result the shape of the transmitted symbols will change within the first symbol period and spread out over the subsequent symbol periods. Such filter operations may occur for example on the control input and LED output of the sync buck power stage. For instance in the example implementation, such a filtering effect may be caused by the control input filter to the sync buck power stage, i.e. the low pass filter of the PCD-DAC in block 48 of FIG. 8. A DAC is constructed by a PWM generator and a low pass filter. The output of the PWM generator is filtered to get a voltage that changes analogue with the duty cycle of the generator.

To account for inter-symbol interference, the adaptive filter 34 uses not only knowledge of the present symbol to determine the required compensation, but also the history of one or more preceding symbol leading into the present symbol.

Figure 14:
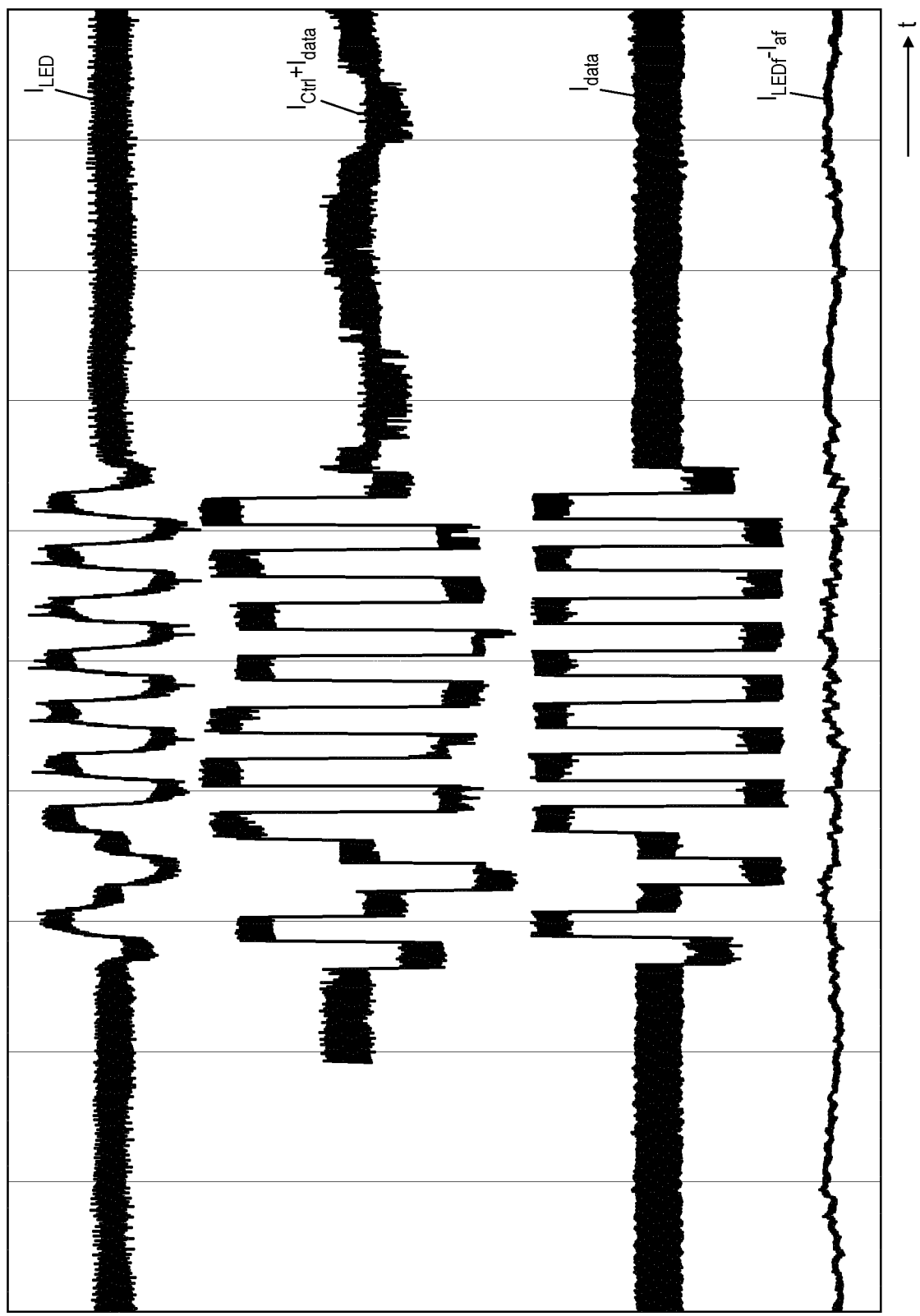
FIG. 14 is a sketch of an oscilloscope trace of various signals from the inter-symbol interference compensation control scheme of FIG. 13.

FIG. 14 shows the same signals as in FIG. 12, but resulting from the inter-symbol interference compensation control scheme of FIG. 13 as opposed to the basic arrangement of FIG. 8. The coded light pulses in the fed back LED current $I_{LEDf}$ are suppressed, and so no longer cause significant disturbances in the output of the current controller 22 and in the resulting LED current ILED (apart from a 100 Hz component still present in the LED current originating from rectifying the (50 Hz) mains voltage—the 100 Hz frequency component is present in the input voltage of the Buck converter and is suppressed by the LED current feedback controller of the Buck; as stated earlier, the bandwidth of this feedback controller amounts to 500 Hz which is sufficient to act on 100 Hz components in the LED current).

The adaptive filter 34 is a digital, self-learning filter in the feedback loop of the LED current controller 22 of the output converter. Its task is to suppress the coded light symbols from the measured LED current $I_{LEDf}$. The adaptive filter comprises, amongst other things, a plurality of feedback controllers, one for each of the different logical transitions between symbols which the ISI compensation is designed to account for (the adaptive filter is therefore a multi-point controller). In the case of ternary Manchester, the adaptive filter comprises twenty-eight such feedback controllers.

The carrier of a coded light messages is emitted light. Coded light is transmitted by changing the intensity levels of the emitted light. The light source in this use-case is a set of series connected LEDs. There is a direct relation between emitted LED light and the associated LED current. The light is modulated by modulation of the LED current. For example the amplitude of the LED current (carrier) may be varied in proportion to the message being transmitted. This technique is called amplitude modulation. A Coded Light message consists of a sequence of symbols. A symbol is a level/state that persists for a fixed period of time.

In this use-case the output-converter is a digital, peak current controlled, synchronous buck converter. The buck converter comprises, among other things, a LED current controller 22.

Figure 15:
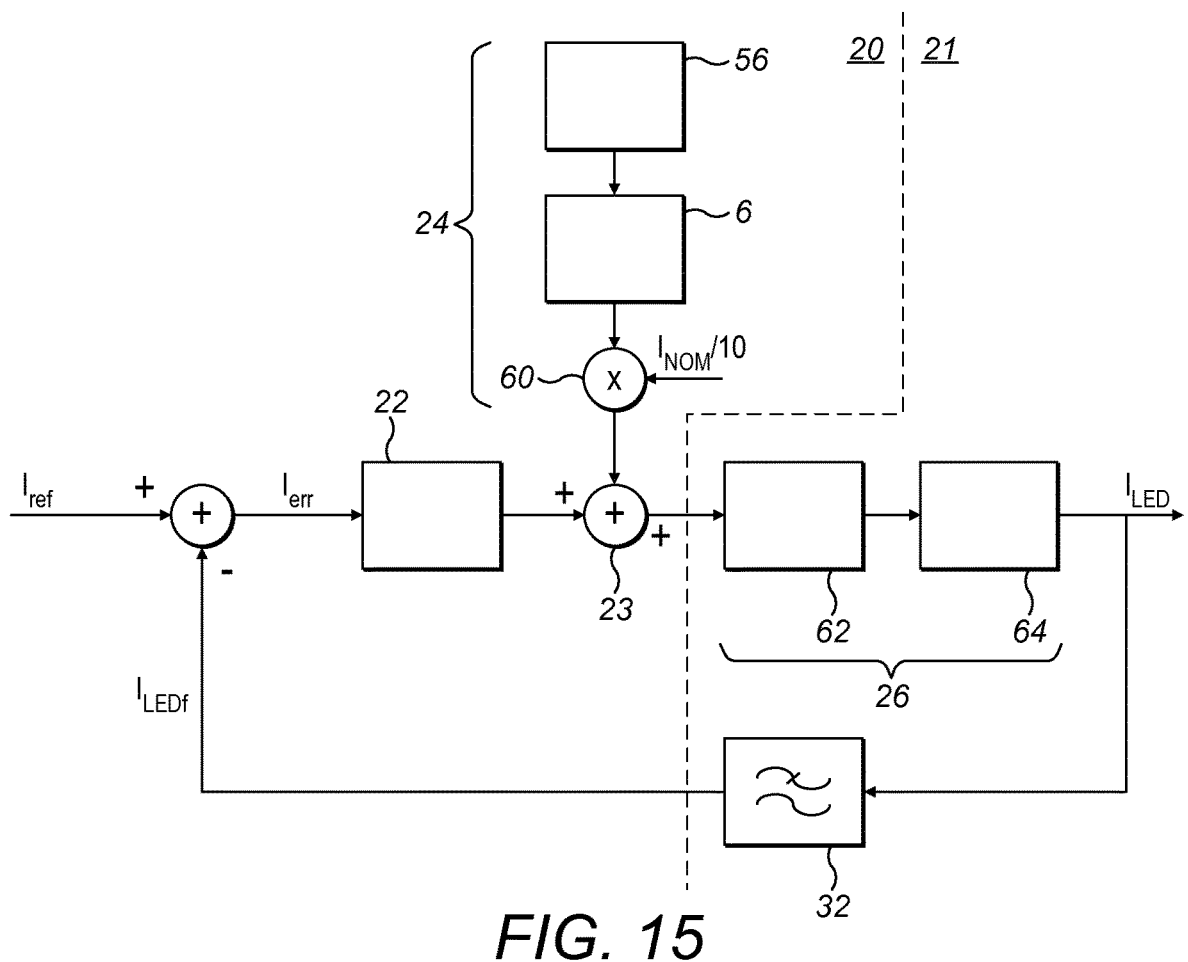
FIG. 15 is a schematic block diagram of a coded light modulation scheme.

FIG. 15 shows the modulation scheme for coded light in more detail. The coded light injector 24, implemented in software, comprises a data source 56 which provides a binary message to be transmitted. For example the binary message may comprise the unique identifier that is associated with the position of the luminaire 2.

The coded light injector 24 further comprises an encoder 6 that converts the binary format of the source message into a format that is suitable for the used transmission medium. A coded light message is converted from plain binary format ("0" and "1" symbols) to an extended Ternary Manchester format. This format uses three symbols "−1", "0" and "1" plus two extra symbols that are used for message- and packet synchronisation ("−0,5" and "0,5"). The Encoder will also insert extra symbols into the encoded message in such a way that the encoded message will not transmit additional energy and as a result will not cause light flicker that is visible to the human eye.

The output of the encoder is scaled by a multiplier 60 and then modulated onto the current control signal $I_{ctrl}$. The size of a symbol in units of lamp current is its ternary Manchester symbol value multiplied by a fraction of the nominal LED current (in general 10%). During a symbol period the symbol-level is maintained. The symbol rate may for example be 2000 symbols/s. For instance, if nominal LED current is set to 350 mA, then the size (i.e. height) of a coded light symbol (a "1") is 35 mA, which is 10% of 350 mA.

The power circuitry 26 comprises an actuator 62 and a process block 64. The actuator 62 in FIG. 15 comprises blocks 48, 50, 52 and 54 of FIG. 13. The "process" block 64 in FIG. 15 represents the LED string 8.

As discussed previously, coded light is implemented by modulating the output $I_{ctrl}$ of the current controller 22 instead of the reference $I_{ref}$. The controller is not aware of coded light but detects filtered coded light pulses in the measured LED current $I_{LEDf}$. Without further measures being taken, the controller 22 will try to remove the coded light pulses from the LED current $I_{LED}$ but only partly succeeds due to its limited bandwidth. A disturbed coded light transmission will result.

Figure 16:
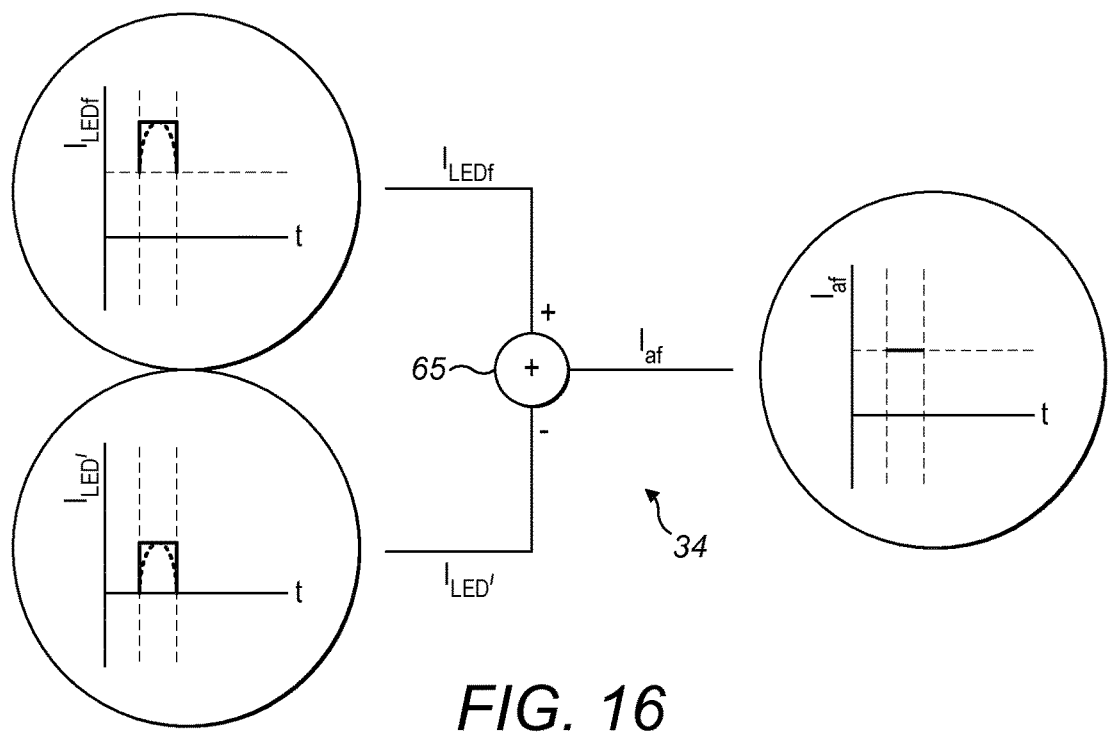
FIG. 16 is a schematic illustration of a feed forward solution to suppress a coded light pulse in the measured LED current.
Figure 17:
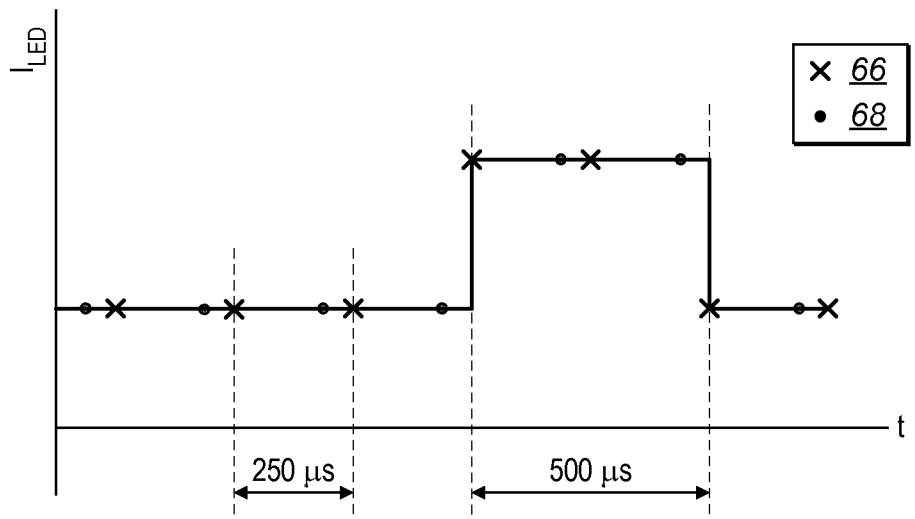
FIG. 17 is a schematically illustrates the timing of example set actions that generate an LED current.

To solve this problem the coded light symbols in the measured LED current $I_{LEDf}$ should be suppressed. The following describes an example feed forward solution to implement this. As shown in FIG. 16, the idea is to generate a coded light symbol $I_{LED}$' that is similar in shape to the coded light symbol in the measured LED current $I_{LEDf}$ and subtract this from the measured LED current.

The shape of a measured coded light pulse is not rectangular as shown in FIG. 16 but deformed due to hardware filters and delays in the signal path, other disturbances, and because the feedback loop contains a low pass hardware filter 32 (e.g. 1592 Hz). The solid lines in the circle on the upper left-hand side of FIG. 16 represent a coded light symbol in the measured LED current when the LED current is not filtered and before it is sampled. The dotted lines represent a coded light symbol when the LED current is filtered but not yet sampled. In embodiments the LED current will be filtered. The two variants shown by the dotted and solid lines are shown to indicate that the coded light symbol in the measured LED current is deformed (dotted line) and, as a result, it is not easy to generate a replica (lower left side circle, which shows the coded light LED current only, so without the DC component in LED current).

The replica $I_{LED}$' of the coded light symbol should match as closely as possible with its original symbol in order to most effectively remove the original symbol. The original symbol is the deformed coded light symbol that resides in the measured LED current $I_{LEDf}$. This symbol may also be called the "residue" of the set coded light symbol. In the case where coded light is added to a standard product without hardware changes, the LED current filter 32 (hardware) of the LED current measurement circuit 28 was not designed to suppress coded light symbols. As a result coded light symbols are not completely suppressed. The part of the coded light symbol in the LED current that is not suppressed by the hardware filter is referred to herein as the "residue". This residue is removed by the algorithm discussed herein. The idea is to synthesize a symbol that has the same shape as the residue, referred to herein as the "replica", and then subtract this replica from the LED current. So, the adaptive filter 34 generates a replica out of the residue. For this reason the residue may also be referred to as the "original" (i.e. the original residue as opposed to the replica of the residue). The original symbol on the other hand is the filtered coded light symbol that resides in the measured LED current.

Note that the symbol wave-shape of the residue depends on and changes with operating setting—and configuration of the driver in a LED luminaire, i.e. LED current and—voltage are configured so as to match the required application, and therefore also coded light symbol size changes. This problem requires a technique that can learn and re-shape the replica symbol (wave-shaping technique) at run-time.

In the presently-described example use-case, the communication speed of coded light is 2000 symbols per second. Every symbol should be set for a period of 500 microseconds. The coded light modulator 23, 24 is activated every 250 microseconds to modulate the next half coded light symbol onto the LED current $I_{LED}$. Two set-points are required to generate one coded light symbol (the Xs in FIG. 17). In this example implementation a symbol is defined by two LED current target values which should be set with an interval of 250 µs. A coded light symbol is sampled twice (the dots in FIG. 17). A set-action is followed by a measurement-action. The measured LED current $I_{LEDf}$ contains the coded light symbol that was last set. Note however that this two-set point example is not limiting and other embodiments may be implemented based on only a single set-point per symbol, or indeed more set-points. With one point there is only information on the level of a given symbol. With two points there is information about the slope, while three or more points provide information on curvature. In other words, more points gives more feedback information for keeping the current level steady. Two points per symbol (level) gives good enough results. Increasing the number of points improves results but at the cost of increasing the rate that the coded Light task scheduler, i.e. sampler, has to run.

Figure 18:
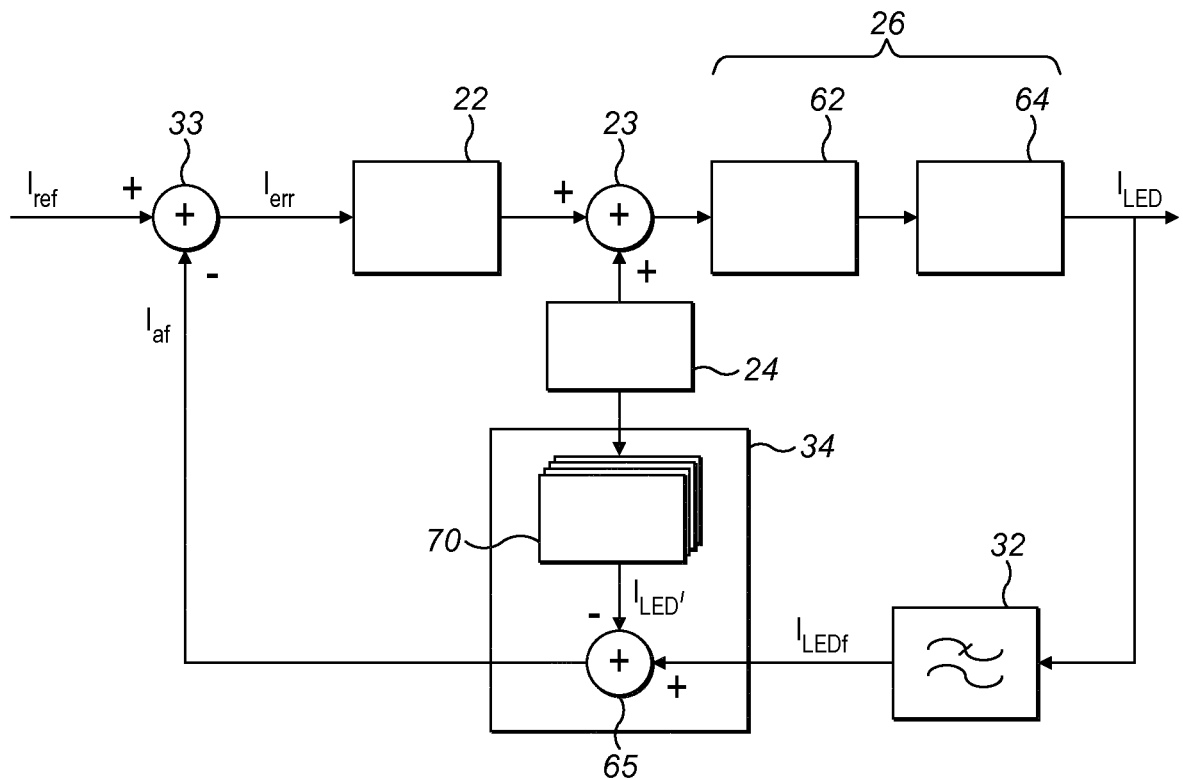
FIG. 18 is a schematic block diagram of a control scheme of an output converter with coded light modulator.

FIG. 18 shows the solution in the control scheme of the output converter according to embodiments of the present disclosure. The coded light injector 24 (including the encoder and scaler 60) generates the LED current level $I_{data}$ that belongs to the coded light symbol to be set. The adaptive filter comprises a "residue controller" 70 which uses this information to generate a symbol level $I_{LED}'$ that is expected to be present in the measured LED current $I_{LEDf}$. The adaptive filter 34 further comprises a (second) subtractor 65 arranged to subtract this generated signal $I_{LED}'$ from the measured LED current $I_{LEDf}$ before it is fed back to the (first) subtractor 33 in the main current control feedback loop.

In fact, preferably the adaptive filter comprises a set of residue controllers 70, one for each possible logical transition that may occur in the data from one symbol to the next.

In embodiments using ternary Manchester as the coding scheme, the adaptive filter 34 should be able to generate the replicas $I_{LED}'$ for the five ternary Manchester coding symbols. Moreover however, experiments show that the shape of a coded light symbol in the measured LED current $I_{LEDf}$ not only depends on the last set symbol, but also on the symbols that were previously set (i.e. the history history). This phenomenal is called inter-symbol interference (ISI). In order to predict the LED current level of the last set symbol, at least the symbol that was set prior to this symbol has to be taken into account. Therefore in embodiments, the adaptive filter 34 is configured to generate a number of replicas $I_{LED}'$ for the same symbol. The number of symbol transitions that are generated by the coded light encoder 6 is fourteen. Each replica (wave shape) consists of two set-points (see above—in the example implementation the period time of one for one coded light symbol is 500 µs, which is two samples when sample period of LED current is 250 µs; and the generated replica is then also represented by two samples, i.e. two LED current set points). Therefore the adaptive filter 34 generates twenty-eight different set-point compensation values to suppress all the coded light symbols in the measured LED current $I_{LEDf}$. A symbol that depends on the prior set symbol is called an "ISI symbol". Note however that in alternative implementations with only a single set-point per symbol, the adaptive filter 24 need generate only fourteen possible compensation values.

Example: the "1" symbol can be preceded by a "0", "−0.5" or "−1" symbol in ternary Manchester. Therefore a scaled "1" symbol in the measured LED current $I_{LEDf}$ has three different shapes dependent on the previously set symbol ("0"→"1", "−0.5"→"1", "−1" →"1").

The table below shows the different possible ISI symbols in ternary Manchester, taking into account a history of one prior elementary symbol.

| ISI symbol | Current set symbol | Previous set symbol |
| --- | --- | --- |
| 0 from −0.5 | 0 | −0.5 |
| 0 from −1 | 0 | −1 |
| 0 from 0.5 | 0 | 0.5 |
| 0 from 1 | 0 | 1 |
| 0.5 from 0 | 0.5 | 0 |
| 0.5 from −1 | 0.5 | −1 |
| 1 from 0 | 1 | 0 |
| 1 from −0.5 | 1 | −0.5 |
| 1 from −1 | 1 | −1 |
| −1 from 0 | −1 | 0 |
| −1 from 0.5 | −1 | 0.5 |
| −1 from 1 | −1 | 1 |
| −0.5 from 0 | −0.5 | 0 |
| −0.5 from 1 | −0.5 | 1 |

Figure 19:
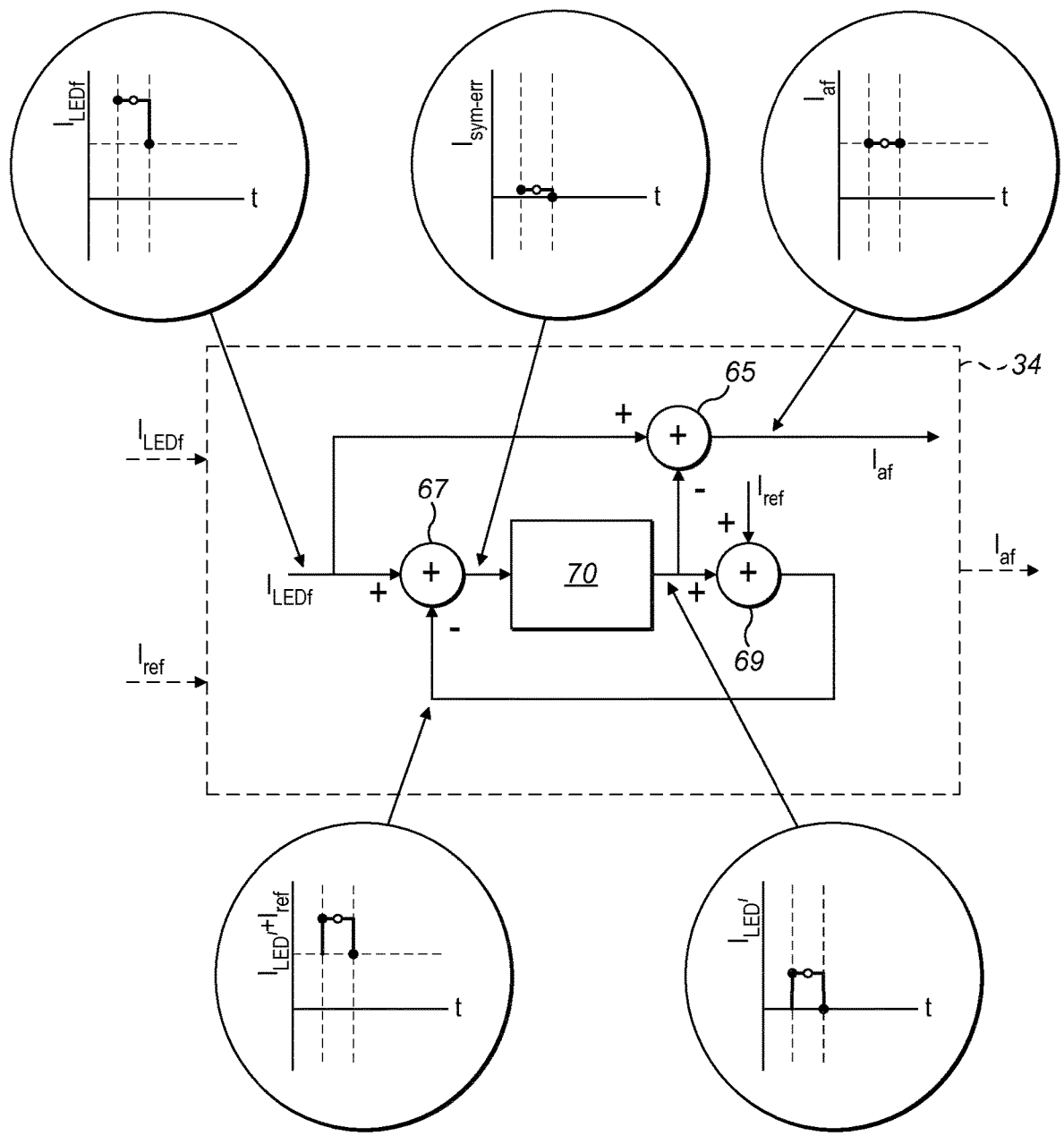
FIG. 19 is a schematic illustration of a residue controller.

The residue controller 70 is arranged in a digital feedback controller as shown in FIG. 19. It controls the shape of a replica symbol $I_{LED}'$ which is used to suppress the original symbols that are in the measured LED current $I_{LEDf}$. Note: in some embodiments, as illustrated in the sketches in the circles of FIG. 19, the residue controllers 70 may only correct each symbol by only a flat, single-value offset (i.e. height). But as also described in the text herein an as illustrated in FIG. 16, in other embodiments the residue controllers 70 may alternatively or additionally be configured to correct the time-varying shape of the symbol waveform. Both are possibilities.

In practice the symbols are shaped, so a shaped correction may be preferred. However this is not essential. In general, coded light wave shape is not required to be square wave. Nonetheless, the height and position in time of coded light levels (−1, −0.5, 0, 0.5, and 1) is most important. For example, sinusoidal shaped coded light with amplitudes at the right amplitude levels and correct moments in time are also detectable and will most probably pass on coded light compliance test tools. Note also that when taking four correction points instead of two per symbol, compensation gets significantly better.

For each residue controller 70, the adaptive filter 34 comprises a further (third) subtractor 67 and a further (second) adder 69. The reference of the residue controller 70 is the measured LED current $I_{LEDf}$ which contains the last set coded light symbol. The feedback of this controller is the predicted LED current which contains a replica $I_{LED}'$ of the last set coded light symbol. To generate this feedback the second adder 69 adds the current control set-point reference $I_{ref}$ from the main current control loop to output of the residue controller 70, i.e. to the replica ILED'. The third subtractor 67 subtracts this feedback ($I_{ref}+I_{LED}'$) from the current measurement $I_{LEDf}$ to produce a symbol error $I_{sym\_err}$. This symbol error $I_{sym\_err}$ is input to the residue controller 70, which acts to minimize the symbol error $I_{sym\_err}$ such that the output ILED' of the residue controller 70 mimics the distortion in each symbol. I.e. the output of the residue controller 70 is the replica of the residue.

The residue controller 70 is enabled when the buck controller 22 has converged. In this state the DC component of the LED current $I_{LED}$ is equal to the reference current $I_{ref}$. The input of the current controller 22, being the difference $I_{err}$ between the measured and predicted LED current is equal to the difference between the measured and predicted coded light symbol. This is called the "Symbol error", $I_{sym\_err}$.

If the symbol error $I_{sym\_err}$ is positive, the set-point of the replica symbol $I_{LED}'$ is too small and should be enlarged. If the symbol error $I_{sym\_err}$ is negative, the set-point of the replica symbol $I_{LED}'$ is too big and has to be made smaller. When the residue controller has converged 70, the set-point levels of the replica and original symbols are the same.

The output of the residue controller 70 is subtracted from the measured LED current $I_{LEDf}$ and then passed to the LED current controller 22. It is also fed back and added to the reference LED current $I_{ref}$ of the controller in order to get the predicted measured LED current.

The residue controller 70 is an integrator. It does not use any knowledge of the plant (the "plant" in control theory represents everything except the controller; here the residue controller 70 does not require any knowledge about the rest of the system, e.g. its transfer function or impulse responses). Dependent on the sign of the symbol set point error, it will make the smallest possible corrections to the size of the predicted coded light symbol set point and by doing so converge to the measured symbol set point. The conversion speed is very low. If the residue controller 70 has converged within a given operating point of the LED current controller 22, it can be disabled because the coded light symbol shape in the measured LED current will not change as long as the operating point is not changed.

Figure 20:
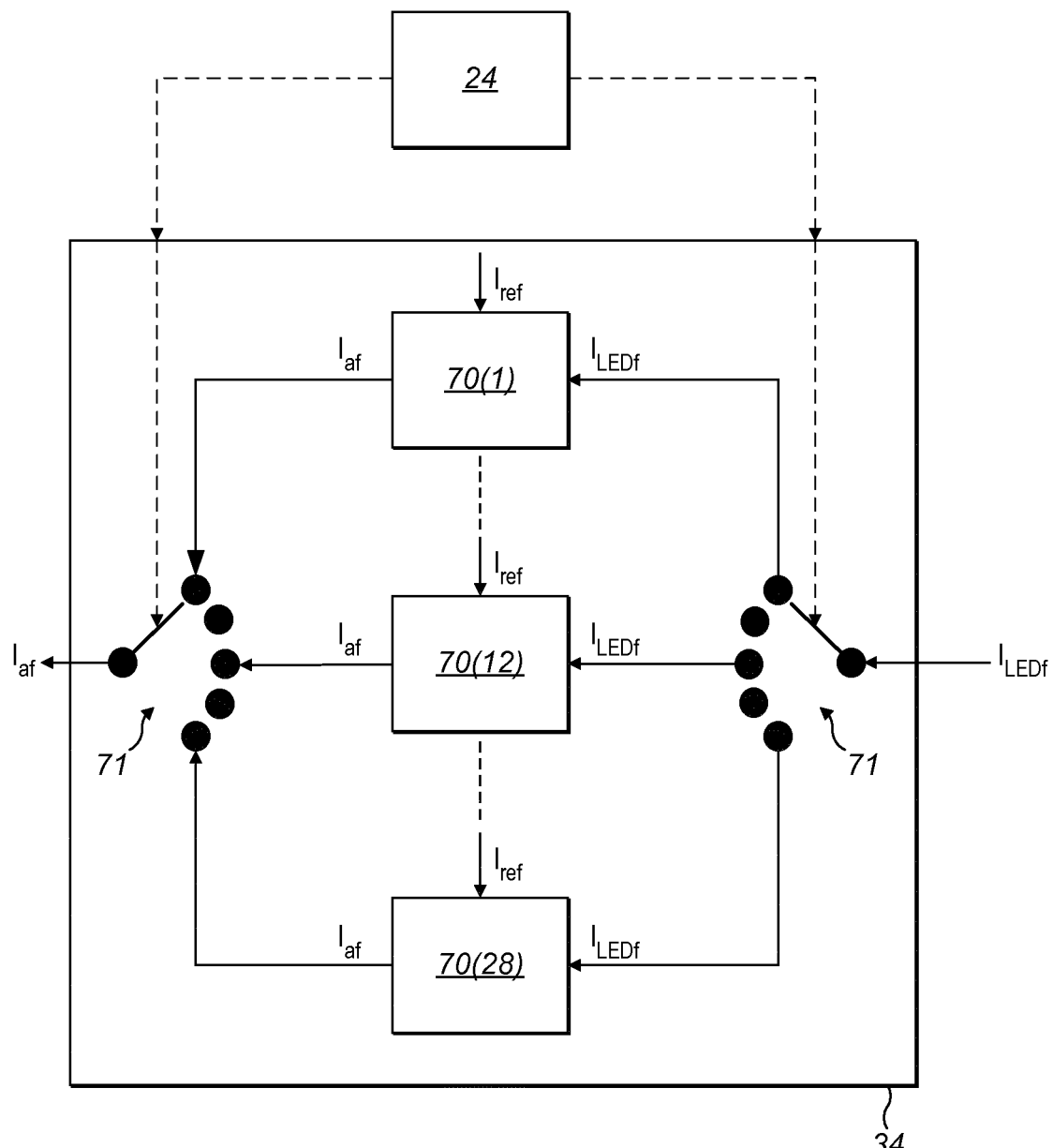
FIG. 20 is a schematic bock diagram of an adaptive filter with per-transition compensation for inter-symbol interference.

The ternary Manchester transmission format of a coded light symbol uses five symbols. As discussed, the shapes of these symbols suffer from Inter-Symbol Interference (ISI) which results in fourteen different symbol shapes (see the above table). Each symbol consists of two set points. Hence in this scenario, a total of twenty-eight set-points are controlled by the same number of residue controllers 70(1) . . . 70(28). As shown in FIG. 20, the adaptive filter comprises a selection means 71 controlled by the coded light injector 24 to select between these different instances of the residue controller. For example if a half-size coded light symbol is modulated, the coded light injector 24 will select to enable the residue controller 70(n) that is associated with the combination of this half-size symbol and the prior set symbol. The execution frequency of the residue controller 70 depends on the number of ISI symbols that resides in one coded light message. A coded light message in one example use-case is transmitted in 36.5 milliseconds. Hence if an ISI symbol appears once in a message then the execution frequency of the residue controller 70 is 27.4 Hz, i.e. 1/36.5 ms.

According to everything discussed above, there has thus been described a scheme in which adaptive inter-symbol interference compensation (i.e. an adaptive filter 34) is added to the reference of the control loop. This way the modulated LED current is not seen as disturbance to the LED current control loop. The adaptive filter 24 configures itself using filtered LED current measurements $I_{LEDf}$.

Figure 21:
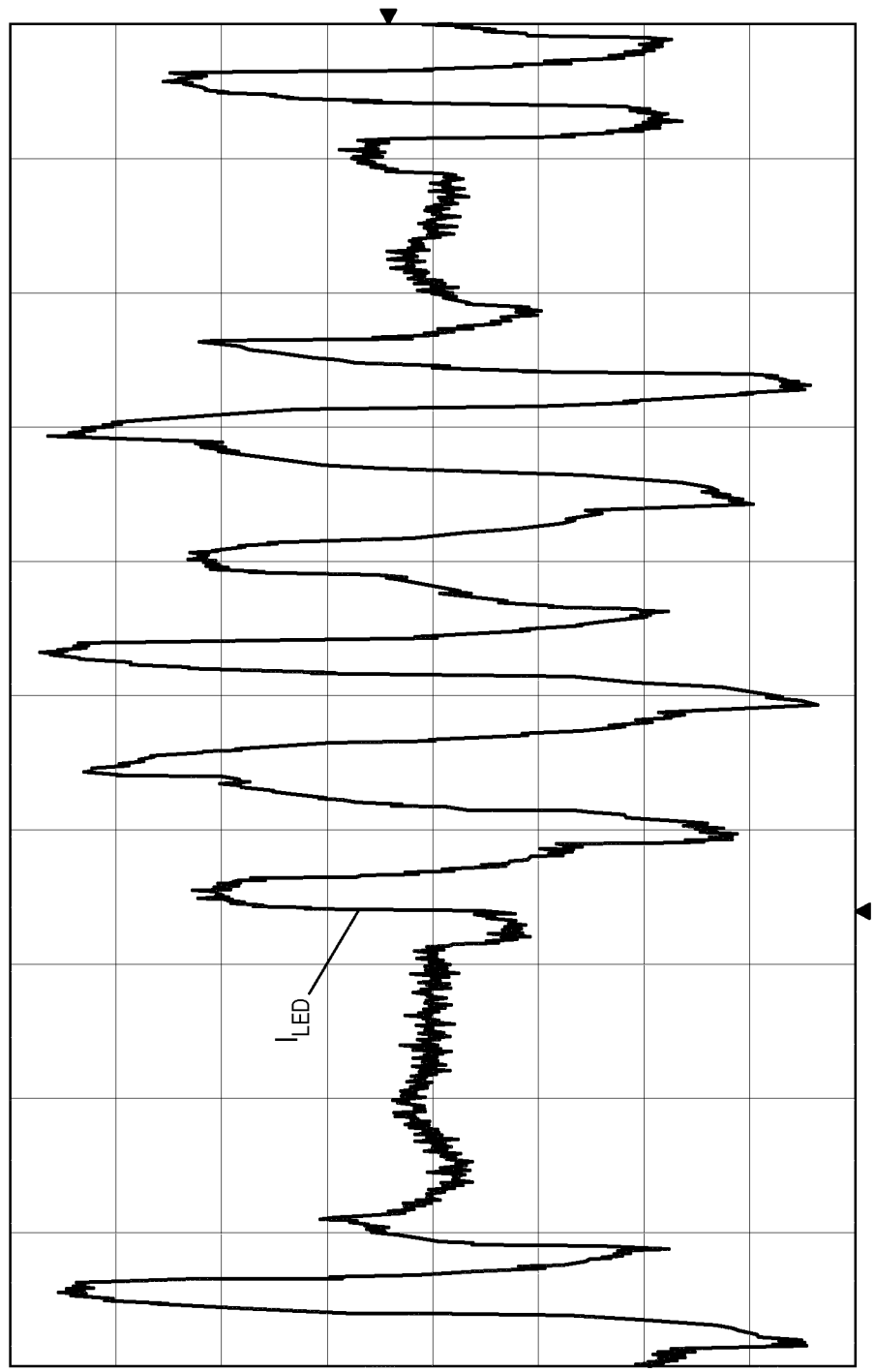
FIG. 21 is a sketch of an oscilloscope trace showing an LED current when transmitting coded light without an adaptive filter.

If coded light symbols were to be superimposed on the LED current but not suppressed in the measured LED current, the LED current $I_{LED}$ would appear as shown in FIG. 21. The shape of coded light symbols are strongly deformed.

Figure 22:
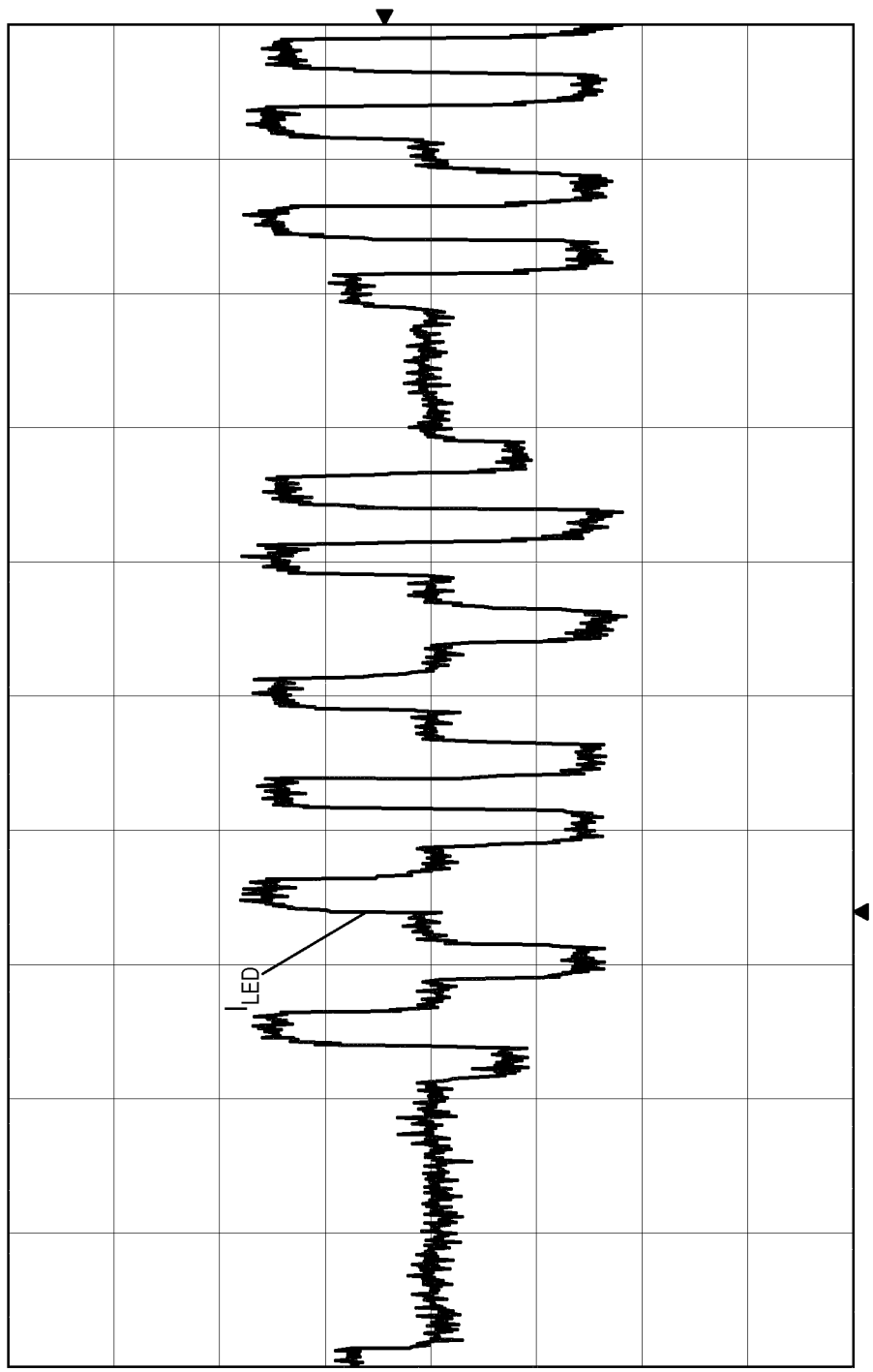
FIG. 22 is a sketch of an oscilloscope trace showing an LED current when transmitting coded light with an adaptive filter.

FIG. 22 on the other hand shows the coded light performance for the same operating point as FIG. 21 but now with the adaptive filter 34 included in the feedback loop of the LED current controller 22.

Figure 23:
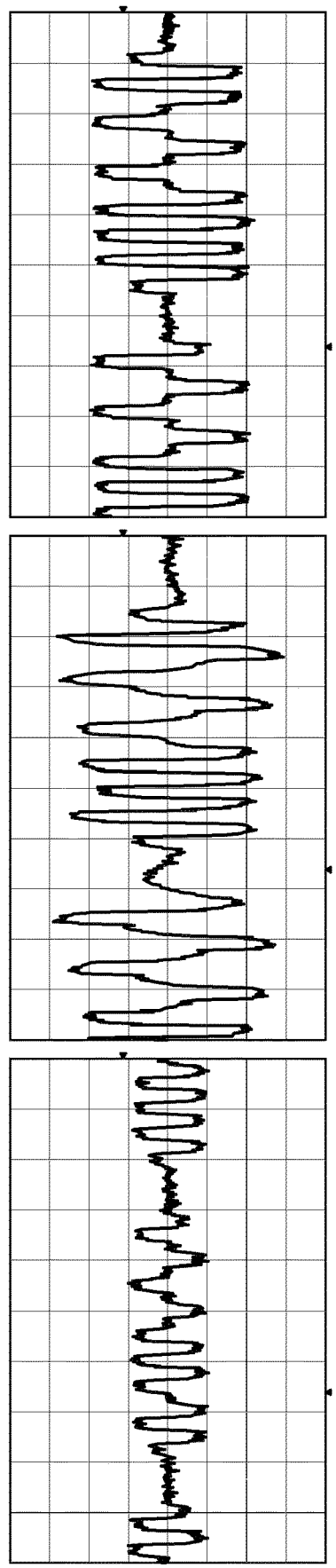
FIG. 23 is a sketch of an oscilloscope trace illustrating the learning process of an adaptive filter due to a change in nominal current.
Figure 24:
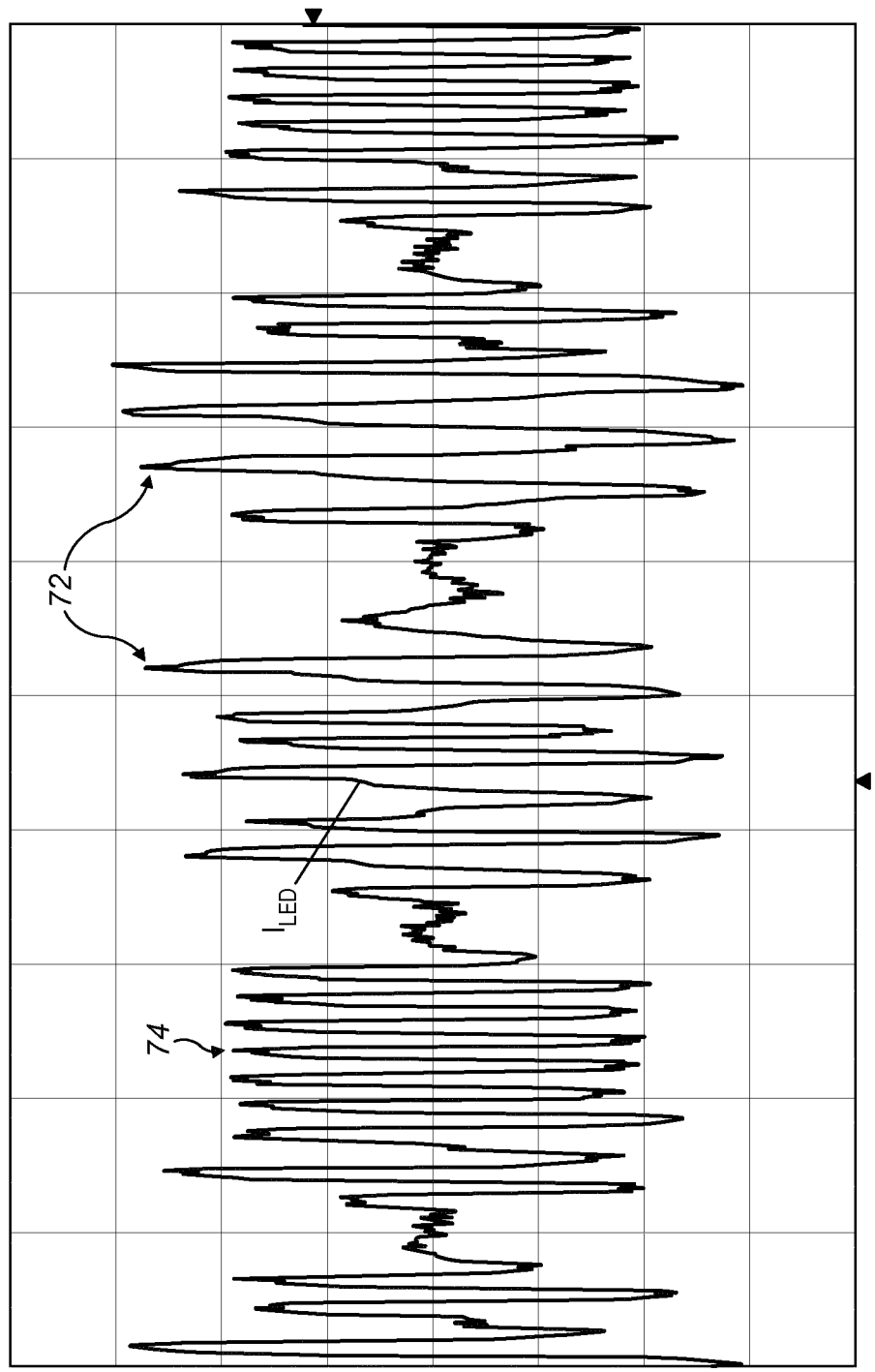
FIG. 24 is a sketch of an oscilloscope trace illustrating the learning process of an adaptive filter wherein the compensations for different symbols are learned with different rate.

The adaptive filter 34 takes time to converge on a respective compensation for a new symbol transition. If the dim-level (output current), load (output voltage) or nominal current is changed, the adaptive filter has to re-learn. FIG. 23 shows the Coded Light performance in three stages when the nominal current was changed from its minimal- to its maximal value. From left to right the pictures show the coded Light performance before, just after and a minute after the transition. Just after the transition, the coded light symbols will gradually reshape to their original form. Note, however, that due to changing nominal LED current also the modulation amplitude has changed. Symbols learn at a different rate depending on the number of occurrences in a message. This difference in learning speed is shown in FIG. 24.

It will be appreciated that the above embodiments have been described by way of example only.

In the claims, the word "comprising" does not exclude other elements or steps, and the indefinite article "a" or "an" does not exclude a plurality. A single processor or other unit may fulfil the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. Apparatus for controlling a current flowing through an illumination source, the driver circuitry comprising:
   current measurement circuitry arranged to take a current measurement measuring the current flowing through the illumination source;
   a current controller configured to output a current control signal to control the current flowing through the illumination source, and thereby control an amount of illumination emitted by the illumination source;
   power circuitry arranged to receive the current control signal and in dependence thereon to drive the current through the illumination source, the current controller being configured to adjust the current control signal based on an error signal representing a comparison between an input set-point and the current measurement fed back from the current measurement circuitry, in order to thereby keep said current through the illumination source on average substantially steady at a level specified by said input set-point;
   a coded light injector arranged to modulate the current control signal output by the current controller in order to cause a sequence of data symbols to be modulated into the current flowing through the illumination source, and to thereby cause the sequence of data symbols to be embedded in the emitted illumination; and
   a compensation filter arranged to receive an indication of the presently transmitted data symbol and apply a compensation to the error signal based thereon, to at least partially remove an effect of a distortion of the current measurement caused by the modulation of the data symbols into said current through the illumination source by means of the compensation.

2. The apparatus of claim 1, wherein the compensation filter takes the form of an adaptive filter arranged to receive feedback of the current measurement for each respective one of said symbols, and based thereon to perform an adaptation of said compensation on a per symbol basis, by adaptively determining a respective distortion between the current measurement and a nominal current expected to represent the respective symbol, and based thereon applying a respective compensation for each of the symbols.

3. The apparatus of claim 2, wherein the adaptive filter is configured to disable the adaptation once converged on a respective result for each symbol.

4. The apparatus of claim 1, wherein the symbols of said sequence are each selected from amongst a discrete set according to an encoding scheme; and
   the compensation filter is configured to apply said compensation by: determining a respective distortion for each possible logical transition allowed by said encoding scheme between at least adjacent pairs of symbols; and for each presently-transmitted one of the symbols in said sequence, determining the transition into the present symbol from at least one adjacently preceding symbol, and applying the respective compensation for the respective transition to the present symbol.

5. The apparatus of claim 4, wherein the compensation filter takes the form of an adaptive filter configured to adaptively determine the respective compensation for each of said transitions based on the feedback of the current measurement.

6. The apparatus of claim 1, wherein the symbols of said sequence are each selected from amongst a discrete set according to an encoding scheme; and and wherein the compensation filter is configured to apply said compensation for each presently-transmitted one of the symbols in said sequence, determine the transition into the present symbol from at least one adjacently preceding symbol, and apply the respective compensation based at least on the respective transition to the present symbol.

7. The apparatus of claim 1, wherein the compensation filter is arranged to apply said compensation to correct an offset of each symbol.

8. The apparatus of claim 1, wherein the compensation filter is arranged to apply said compensation to correct a waveform shape of each symbol.

9. The apparatus of claim 1, wherein the compensation filter is arranged to control, modulate, measure and compensate the current in terms of its amplitude.

10. The apparatus of any claim 1, wherein the compensation filter is arranged to control, modulate, measure and compensate the current through the illumination source in terms of its duty cycle in a pulse width modulation scheme.

11. The apparatus of claim 1, wherein said illumination source takes the form an LED-based illumination source comprising one or more LEDs.

12. The apparatus of claim 1, wherein the current measurement circuitry comprises a current feedback filter arranged to smooth the current measurement.

13. The apparatus of claim 1, wherein the current controller and coded light injector are implemented in software arranged to run on one or more processing units of an LED driver, whilst said power circuitry is implemented in dedicated hardware circuitry.

14. A method of controlling a current flowing through an illumination source, the method comprising:

taking a current measurement of the current flowing through the illumination source;

outputting a current control signal to power circuitry driving the current through the illumination source, in order to control the current flowing through the illumination source, and thereby control an amount of illumination emitted by the illumination source;

adjusting the current control signal based on an error signal representing a comparison between an input set-point and the current measurement, in order to thereby keep said current through the illumination source on average substantially steady at a level specified by said set-point;

modulating the current control signal prior to supply to the power circuitry, in order to cause a sequence of data symbols to be modulated into the current flowing through the illumination source, and to thereby cause the sequence of data symbols to be embedded in the emitted illumination; and receiving an indication of the presently transmitted data symbol and applying a compensation to the error signal based thereon, to at least partially remove an effect of a distortion of the current measurement caused by the modulation of the data symbols into said current through the illumination source by means of the compensation.

15. A computer program product for controlling a current flowing through an illumination source, the computer program product comprising code embodied on computer-readable storage and/or being downloadable therefrom, being configured so as when run on one or more processing units to perform the steps of claim 14.

* * * * *